US011970264B2

(12) United States Patent
Butterfield

(10) Patent No.: US 11,970,264 B2
(45) Date of Patent: Apr. 30, 2024

(54) VERTICAL TAKEOFF AND LANDING (VTOL) AIRCRAFT SYSTEMS AND METHODS

(71) Applicant: William Swindt Butterfield, Mountain View, CA (US)

(72) Inventor: William Swindt Butterfield, Mountain View, CA (US)

( * ) Notice: Subject to any disclaimer, the term of this patent is extended or adjusted under 35 U.S.C. 154(b) by 7 days.

(21) Appl. No.: 17/480,890

(22) Filed: Sep. 21, 2021

(65) Prior Publication Data

US 2023/0406487 A1 Dec. 21, 2023

(51) Int. Cl.
*B64C 27/08* (2023.01)
*B64C 27/52* (2006.01)
*B64D 17/80* (2006.01)
*B64D 27/24* (2006.01)

(52) U.S. Cl.
CPC .............. *B64C 27/08* (2013.01); *B64C 27/52* (2013.01); *B64D 17/80* (2013.01); *B64D 27/24* (2013.01)

(58) Field of Classification Search
CPC ......... B64C 27/08; B64C 27/20; B64C 27/52; B64C 29/02
See application file for complete search history.

(56) References Cited

U.S. PATENT DOCUMENTS

| | | | | |
|---|---|---|---|---|
| 2003/0111575 | A1* | 6/2003 | Rehkemper | A63H 27/12 244/17.11 |
| 2015/0012154 | A1* | 1/2015 | Senkel | B64C 27/473 701/4 |
| 2018/0141647 | A1* | 5/2018 | Suzuki | B64U 50/13 |
| 2020/0377207 | A1* | 12/2020 | Suzuki | B64C 27/54 |
| 2021/0339850 | A1* | 11/2021 | Predonu | B64D 27/24 |
| 2022/0119099 | A1* | 4/2022 | Ye | B64C 27/08 |

* cited by examiner

*Primary Examiner* — Timothy D Collins
*Assistant Examiner* — Terri L Filosi
(74) *Attorney, Agent, or Firm* — Maynard Nexsen PC; Ilya S. Mirov

(57) ABSTRACT

An electrically-powered VTOL aircraft has a fuselage with a cabin flexibly connected to a powerplane assembly that includes a plurality of electrically-powered rotors and booms. The powerplane assembly can pitch and roll relative to and independently of the cabin, thereby generating efficient fore, aft and lateral thrust while the cabin attitude remains unchanged. This provides a stable passenger experience and enhanced performance and controllability with reduced cost and complexity. In some embodiments, the fuselage is vertically elongated and the powerplane assembly mounts above the fuselage such that a person may walk beneath the rotors completely erect without the fear of being struck by any of the rotors. Using a vertically elongated cabin in conjunction with a relatively high powerplane provides various performance benefits that improve controllability and maneuverability particularly in congested environments, reduce complexity and costs, and enhance passenger safety and experience.

30 Claims, 22 Drawing Sheets

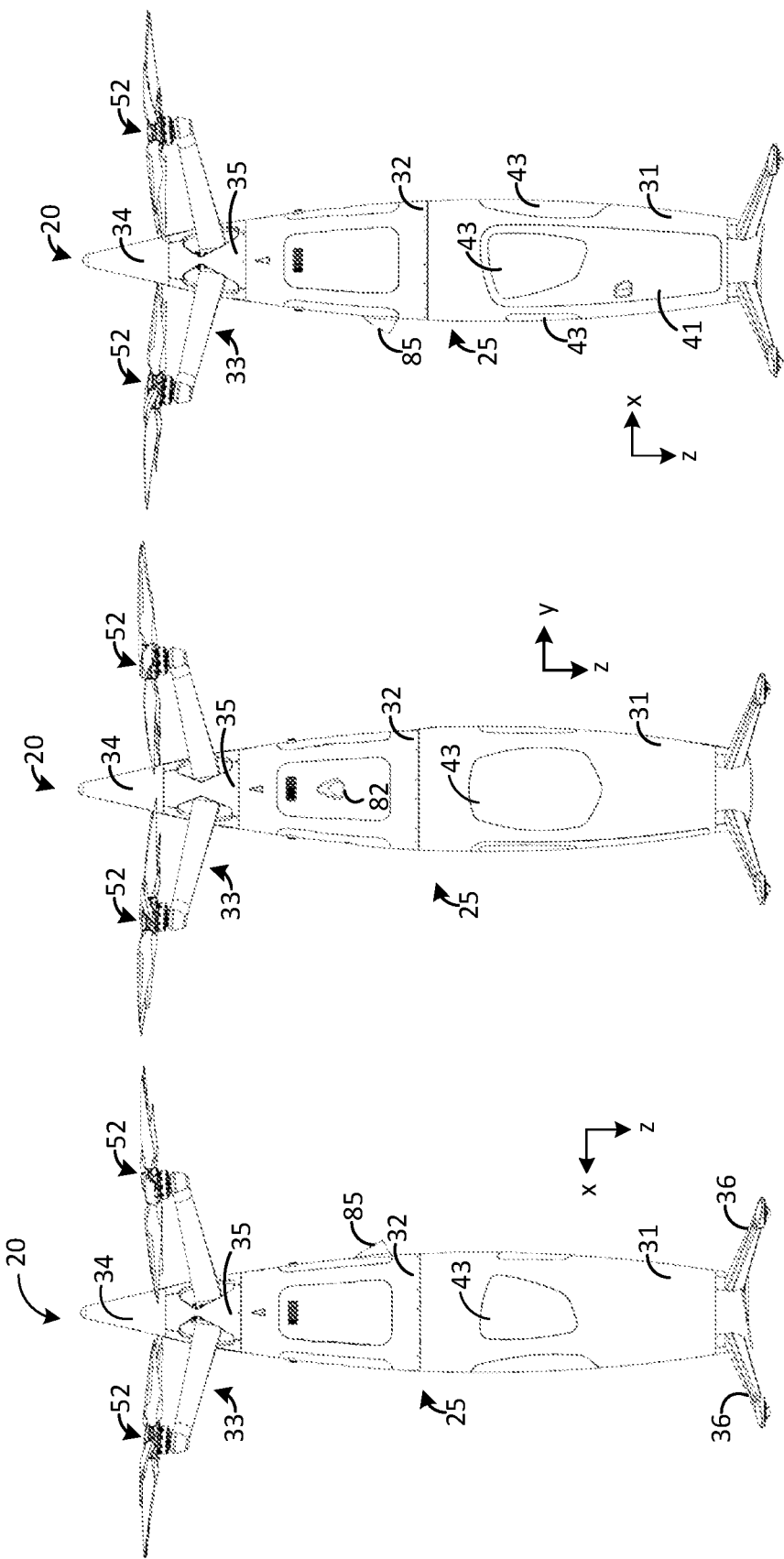

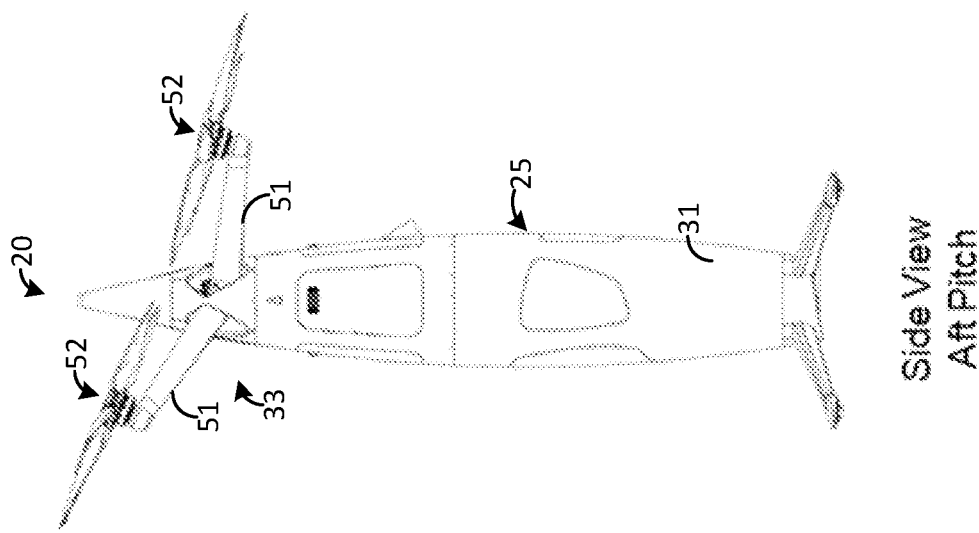
FIG. 5 — Side View Aft Pitch
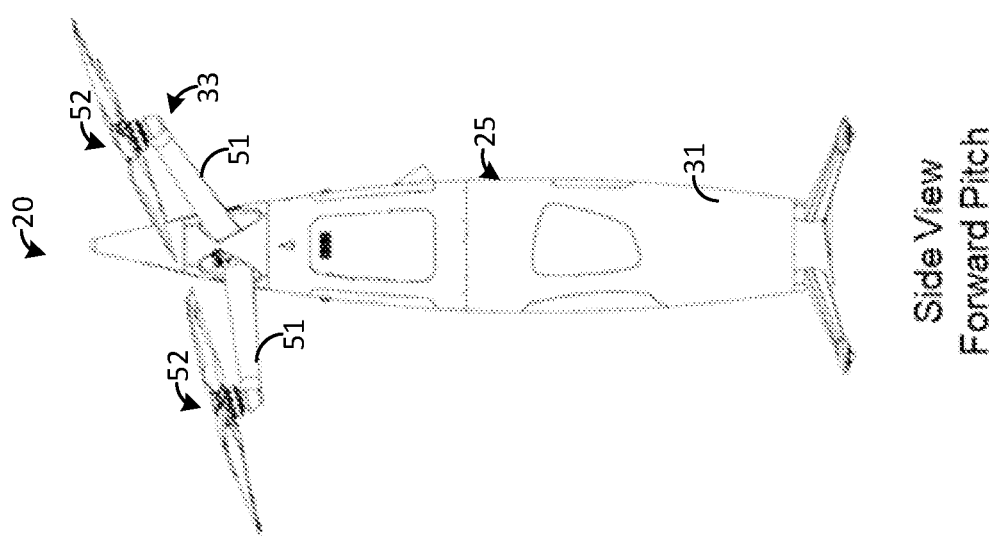
FIG. 6 — Side View Forward Pitch

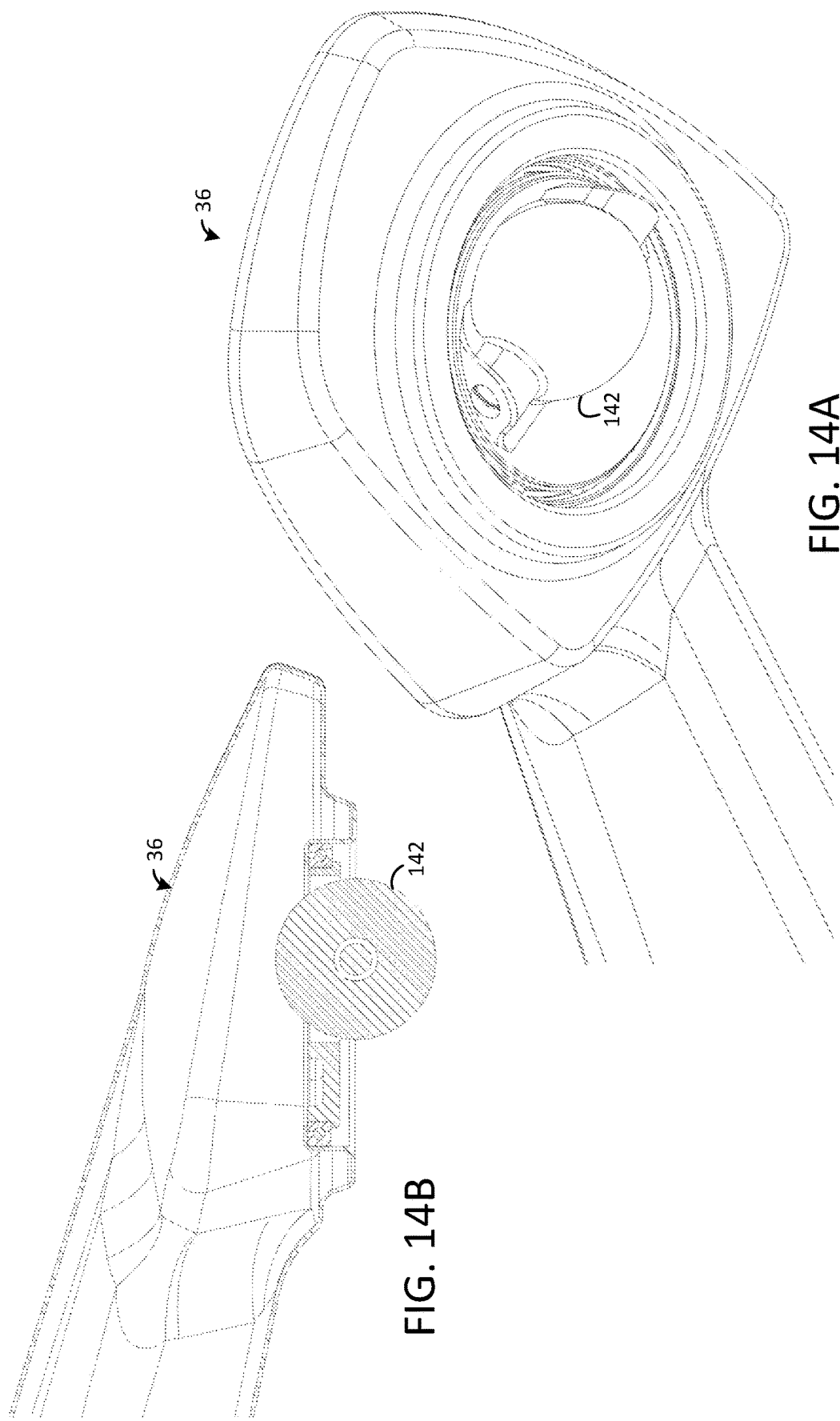

VERTICAL TAKEOFF AND LANDING (VTOL) AIRCRAFT SYSTEMS AND METHODS

RELATED ART

Aircraft design and configuration vary according to mission objectives and constraints. Electrically-powered vertical takeoff and landing (VTOL) aircraft have many benefits that make them attractive for use in short-range transport, especially in urban, suburban or parkland settings where suitable landing zones for conventional aircraft may be limited. For example, the ability to take-off vertically, hover, and in some cases to perform tight aerial maneuvers, enable such aircraft to operate safely around structures and in congested environments that are inaccessible to many other types of aircraft. Furthermore, electric aircraft can be designed to operate more quietly than other aircraft, allowing electric aircraft to operate in populated areas without violating applicable noise regulations.

A wide range of electrically-powered VTOL aircraft designs have been introduced in recent years, primarily focused on passenger or small cargo transport in environments where ground-based traffic congestion makes such aircraft an attractive alternative. While designs vary greatly according to mission objectives, most fall into one of three broad categories: Multirotor (aka Multicopter) solutions are simple and cost-effective, but have limited range and generate horizontal thrust by tilting the airframe, which may be uncomfortable for some passengers. Lift+Cruise solutions increase range by adding wings and a separate forward propulsion system, but in so doing may lose maneuverability and add weight, cost and complexity (particularly with regard to the transition from rotor-born vertical flight to wing-born horizontal flight). Tilt Rotor solutions (aka Vectored Thrust) also add wings to increase range, but use tilting rotors or wing/rotor assemblies to generate both vertical and horizontal thrust from individual propulsion units, again at the price of complexity, cost, and reliability concerns. In summary, it is challenging to design electrically-powered VTOL aircraft that combine performance, safety, and a stable and reassuring passenger experience in a cost-effective, maneuverable package suitable for use in congested environments. Thus, alternative or improved designs of eVTOL aircraft are generally desirable.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 1B depicts a left side view of the VTOL aircraft depicted by FIG. 1A.

FIG. 1C depicts a front view of the VTOL aircraft depicted by FIG. 1A.

FIG. 1D depicts a right side view of the VTOL aircraft depicted by FIG. 1A.

FIG. 5 depicts a side view of the VTOL aircraft of FIG. 1A with a powerplane assembly of the aircraft positioned with aft pitch.

FIG. 6 depicts a side view of the VTOL aircraft of FIG. 1A with a powerplane assembly of the aircraft positioned with forward pitch.

FIG. 14A depicts a bottom perspective view of a landing gear leg with self-catering roller, such as is depicted by FIG. 1A.

FIG. 14B depicts a cross-sectional view of the landing gear foot depicted by FIG. 14A.

DETAILED DESCRIPTION

Figure 1A:
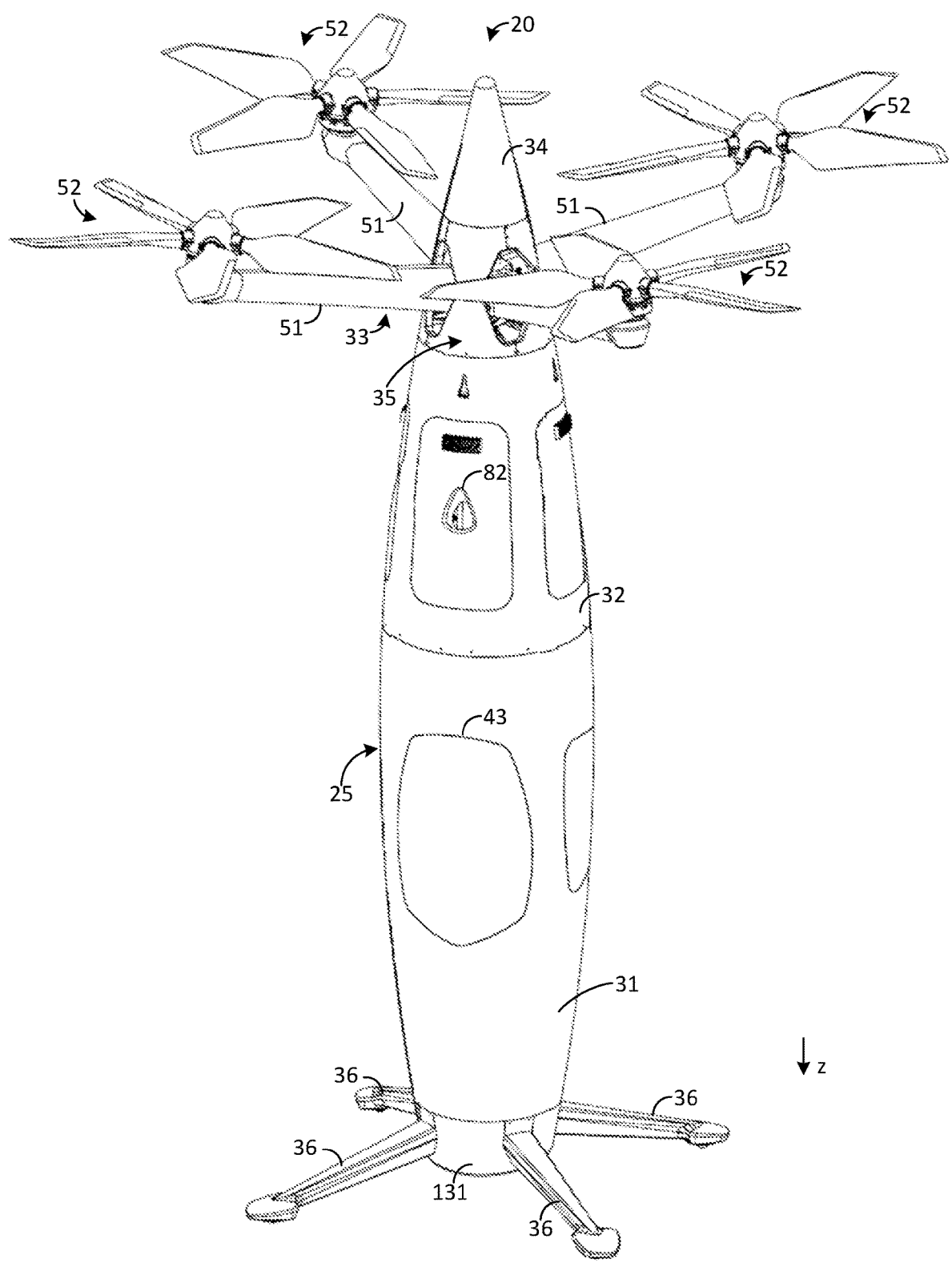
FIG. 1A depicts a perspective view of an embodiment of a vertical takeoff and landing (VTOL) aircraft.

The present disclosure generally relates to VTOL aircraft systems and methods, and various embodiments are described herein. In some embodiments of the present disclosure, an electrically-powered VTOL aircraft has a fuselage that is vertically elongated with a plurality of electrically-powered rotors mounted above the fuselage. The rotors are mounted sufficiently high above the ground such that a person may safely walk completely erect beneath the rotors without being struck by any of the rotors. Each rotor motor is mounted to one end of a boom, with the other end of the boom joined to a central connector, and together the rotors, motors, booms and central connector form a powerplane assembly. The powerplane assembly is joined to the fuselage by a pivotal coupling, which enables the powerplane assembly to pitch and roll independently of the fuselage.

The vertically elongated fuselage with elevated powerplane assembly offers a wide range of benefits including (but not limited to) fast, easy entry and exit; enhanced passenger and pedestrian safety during ground operations, maintenance, boarding and flight; minimal ground footprint independent of rotor or powerplane diameter; reduced rotor wash interaction with the ground, buildings or structures; reduced susceptibility to rotor damage due to ground handling or recirculated debris; a minimized planform silhouette which makes the flying vehicle less obtrusive to ground observers; and a 360° view for passengers.

In some embodiments, a multirotor VTOL aircraft comprises a fuselage that is pivotally coupled to a separate powerplane assembly having a plurality of electrically-powered rotors joined by booms and a boom mount so as to form a single structural unit. In a preferred embodiment, the pivotal coupling comprises a biaxial joint which enables the fuselage to hang freely from the powerplane assembly in flight, so that the powerplane assembly is free to pitch and roll independently of the fuselage 25, but remains indexed to the fuselage in yaw. By this means the powerplane assembly is able to tilt and generate improved thrust efficiency in any compass direction of the x/y plane without the cost or complexity of an actuating mechanism, while also offering an improved passenger experience by maintaining a substantially constant fuselage attitude with respect to ground. In this regard, free movement of the powerplane assembly about the pitch and roll axis not only helps to reduce tilting of the fuselage, but it also allows the thrust vectors for propelling the aircraft to be controlled to thrust the aircraft in any direction of the x/y plane as may be necessary or desired without changing the cabin heading. Thus, cabin tilt and heading changes can be reduced during maneuvering, providing a more relaxing flight for the passenger. Some additional benefits of this embodiment include isolation of the fuselage from powerplane-induced vibration; simplified structural loading of the fuselage by the elimination of rotor-induced bending loads; and quickened control system responsiveness resulting from the reduced mass and moments of inertia of the powerplane assembly compared with a complete, non-pivoting airframe.

Thus, VTOL aircraft systems in some embodiments combine a simple, robust and reliable method of enhancing multirotor performance with a stable, reassuring passenger experience during take-off, transition, and cruise, thereby realizing a simple, efficient, short-range, electrically-powered VTOL aircraft that provides enhanced performance and a comfortable passenger experience with reduced manufacturing, operating, maintenance and logistics costs.

FIGS. 1A-1D depict an exemplary embodiment of a VTOL aircraft 20 that may be used to transport passengers or cargo. The aircraft 20 has a fuselage 25 that is vertically elongated (in the z-direction). For illustrative purposes, it will be assumed herein that the x-direction shown in the drawings is parallel to the roll axis, the z-direction shown in the drawings is parallel to the yaw axis, and the pitch axis (parallel to a y-direction) is perpendicular to both the x-direction and the z-direction shown in the drawings.

As an example, the fuselage 25 may be vertically elongated such that it has an aspect ratio ($h_f/w_f$), referred to hereafter as "fuselage aspect ratio," of about 2.0 or greater, where "$h_f$" is the maximum height of the fuselage 25 in the z-direction and "$w_f$" is the maximum width of the fuselage 25 in the x-direction. However, a greater fuselage aspect ratio may help to increase the height of the powerplane assembly 33, thereby realizing various benefits, as will be described in more detail below. To enhance at least some of these benefits, it may be desirable for the fuselage aspect ratio to be at least 3.0 or even 4.0 or more. As an example, a greater fuselage aspect ratio helps to increase rotor height relative to a given horizontal footprint. Having a greater rotor height not only provides some performance benefits, as described in more detail below, but also may help to provide passengers with a greater sense of safety. It may also reduce the rotor wash felt by a passenger or other user while walking beneath the rotors 52.

The vertical orientation of the fuselage 25 also helps to optimize the shape of the fuselage 25 for streamwise aerodynamic efficiency and reduced VTOL drag. In addition, the vertical orientation of the fuselage 25 is subject to tensile and compressive loads, with little bending input. This load regime simplifies weight optimization and is ideal for carbon fiber structures. Some additional benefits include: provide more room to accommodate one or more standing passengers and provide easy entry and exit to the cabin for passengers; reduce the ground footprint, helping to facilitate maneuvers in confined or congested areas; and provide greater vertical cabin space to accommodate long, unwieldy cargo. In other embodiments, aspect ratios below 2.0 are possible, and it is unnecessary for the fuselage 25 to be vertically elongated. Indeed, although the vertical orientation of the fuselage 25 has many advantages, as described herein, it should be emphasized that such vertical orientation is unnecessary in all embodiments, and any shape of the fuselage 25 is possible in other embodiments.

The fuselage 25 has one or more modules, such as a cabin 31, a powerpack assembly 32, a powerplane section 35, and a nose 34 (which is tapered in the shape a cone, though other shapes are possible). The fuselage 25 is coupled to a powerplane assembly 33, which includes booms 51 and rotors 52, used to provide lift and controllability as will be described in more detail below. In some embodiments, the walls of the fuselage 25 are composed of a carbon fiber material helping to reduce weight. As shown by FIG. 1A, the aircraft 20 has landing gear comprising a plurality of legs 36 that extend from the bottom of the fuselage 25 and make contact with the ground when the aircraft 20 lands. In one embodiment, the aircraft 20 has four such legs 36, but other numbers of legs 36 less than or greater than four are possible in other embodiments. In the embodiment depicted by FIG. 1A, the aircraft 20 is dimensioned such that, when it is on the ground prior to takeoff, the bottom of the cabin 31 is about 1.2 feet above the ground, the bottom of the powerpack assembly 32 is about 9.1 feet above the ground, the bottom of the powerplane section 35 is about 16.6 feet above the ground, and the top of the nose 34 is about 18.1 feet above the ground such that the overall height of the fuselage 25 is about 18.1 feet above the ground.

In some embodiments, the aircraft 20 is designed to have a cruise speed of up to about 60 miles per hour with a weight of about 900 pounds and a targeted service range of about 10 miles (with reserve). In addition, the aircraft 20 is designed to produce noise during takeoff of less than 60 decibels (db) from a distance of 50 feet. In other embodiments, other design and performance characteristics are possible.

The cabin 31 forms a compartment in which cargo, passengers, and/or other types of payload may be situated for transport, and will sometimes be referred to hereafter as "passenger cabin." In the embodiment depicted by FIG. 1A, the cabin 31 is designed to accommodate a single passenger who stands on a floor 38 (FIG. 2) of the cabin 31 during operation. Also, the cabin 31 has a door 41 (FIG. 1D) through which the passenger may enter the cabin 31, and the cabin 31 has a plurality of windows 43 through which the passenger may see outside the cabin 31. In other embodiments, the cabin 31 may be designed to accommodate a greater number of passengers and/or other types of payload, such as cargo (e.g., one or more packages to be delivered to one or more locations), and use of windows 43 is unnecessary. In addition, the cabin 31 may include one or more seats for permitting one or more passengers to sit as may be desired during transport.

The vertical orientation of the fuselage 25 and, in particular, the cabin 31 allows a passenger to stand or maintain an upright posture, which may be preferred or more enjoyable to the passenger, enables rapid entry and exit, and is easy to clean between flights. Further, as will be described in more detail below, the aircraft 20 may be designed such that the cabin 31 experiences very little or no movement about the pitch axis and roll axis in response to differential thrusting of the rotors 52, thereby reducing or eliminating perturbations or movements experienced by the passenger during flight. The vertical orientation is also conducive to a simple but effective ballistic recovery system (BRS) design, which will be described in more detail below. The BRS may be configured to deploy one or more parachutes in such a way that the orientation of the cabin 31 during parachute recovery remains substantially similar to its orientation during normal flight, thereby helping to reassure the passenger during an emergency event. Also, the BRS may be located above the powerplane assembly 33, helping to keep the parachute lines clear of the powerplane rotors 52. In addition, the parachute opening shock loads are fed into the airframe in pure tension, simplifying airframe structural design.

The shape of the vertically elongated fuselage 25 is preferably streamlined so as to reduce aerodynamic drag from air being blown over the fuselage 25 by the rotors 52. In the embodiment depicted by FIG. 1A, the fuselage 25 has a generally circular cross-section along its longitudinal axis (which is parallel to the z-direction in the exemplary embodiment of FIG. 1A), and the fuselage 25 may be tapered. As an example and as shown by FIG. 1A, the fuselage's diameter or width may increase downward in the z-direction from the top of the fuselage 25 in order to provide greater area for the powerpack assembly 32 and the cabin 31. However, the diameter of the lower portion of the cabin 31 slightly decreases toward the base of the cabin 31. In some embodiments, the maximum diameter or width of the cabin 31 is about 38 inches, but other maximum cabin widths are possible. In other embodiments, the fuselage 25 may have other types of profiles and contours, and as noted above, the pivotally-coupled powerplane assembly described herein is compatible with a wide range of vertically or horizontally elongated fuselage configurations.

The shape and dimensions of the cabin 31 are designed such that a single passenger may comfortably stand fully erect in the cabin 31 during flight. In some embodiments, the interior height of the cabin 31 from floor to ceiling is about 7.9 feet, though other heights are possible in other embodiments. Indeed, heights above about 6.5 to 7.0 feet will accommodate the heights of most passengers in order to allow them to stand fully erect in the cabin 31. In some embodiments, the cabin 31 may have one or more holding apparatuses, such as a handrail (not shown) or hand strap, mounted on an interior wall of the cabin 31, and a passenger may hold onto such holding apparatus during flight in order to help maintain balance. To provide more room for standing, the cabin 31 may be designed without a passenger seat, but it is possible for the cabin 31 to have one or more seats in which one or more passengers may sit during flight. Yet other designs and configurations of the cabin 31 are possible in other embodiments.

The powerplane assembly 33 comprises a plurality of booms 51 extending from a central mount and a plurality of rotors 52 respectively mounted on the booms 51. In the embodiment depicted by FIGS. 1A and 3, the powerplane assembly 33 has four booms 51 and four rotors 52 with five blades each, but the powerplane assembly 33 may have other numbers of booms 51, rotors 52, or rotor blades in other embodiments. In the embodiment depicted by FIGS. 1A and 3, the rotors 52 provide sufficient lift for the aircraft 20 without the need of other lift-generating apparatuses, such as wings. However, in other embodiments, the aircraft 20 may have winglets or other lift-generating apparatuses, which may help to increase the range of the aircraft 20.

Figure 4:
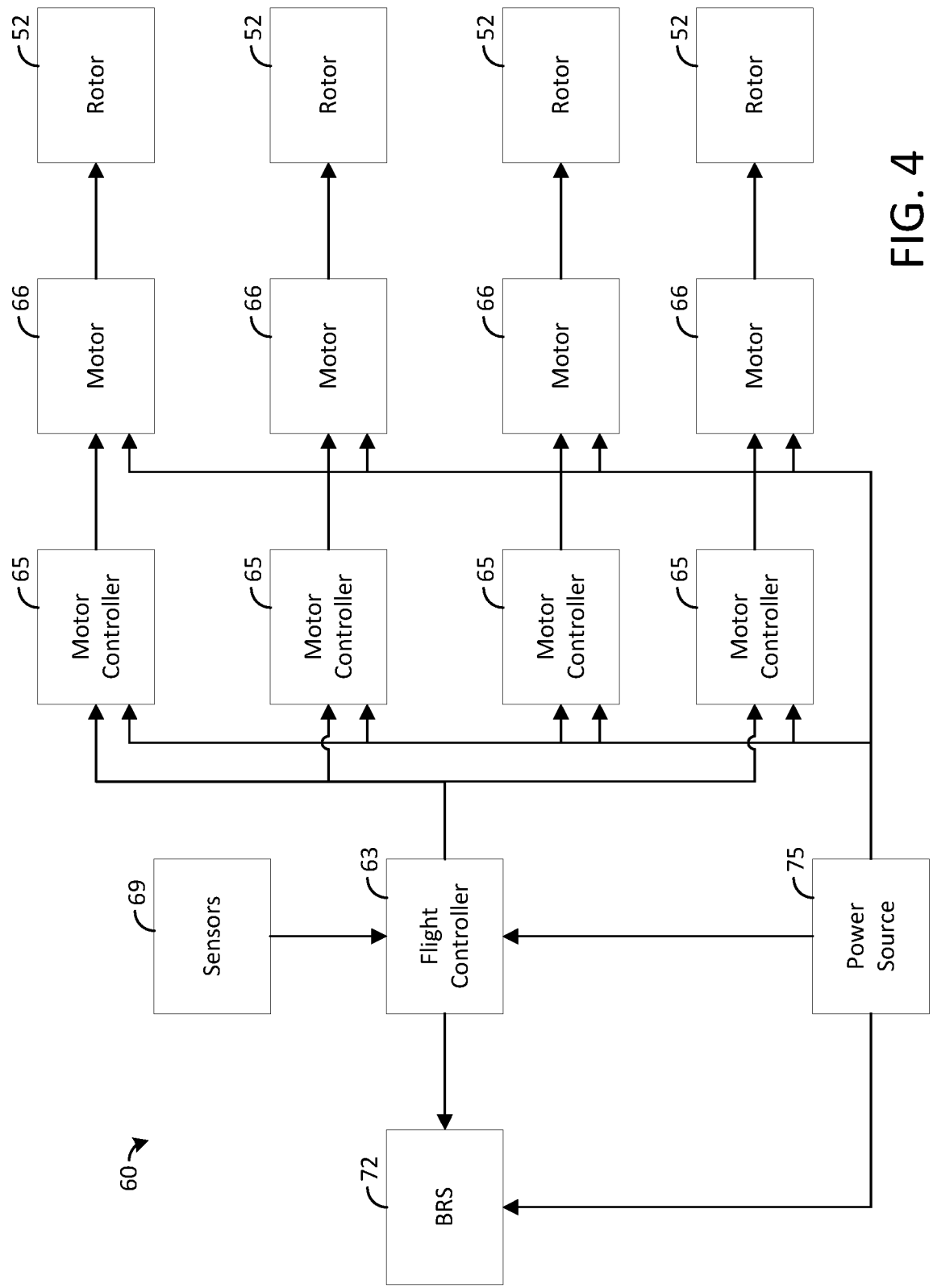
FIG. 4 is a block diagram illustrating an embodiment of a flight control system for controlling VTOL aircraft, such as is depicted by FIG. 1A.

The rotors 52 are driven by motors 66 (FIG. 2) that cause the rotors 52 to generate aerodynamic thrust to be used for generating lift and controlling powerplane pitch, roll, and yaw. In this regard, FIG. 4 shows an exemplary flight control system 60 of the aircraft 20 that can be used to control movement of the aircraft 20. In the embodiment depicted by FIG. 4, the system 60 comprises a flight controller 63 that is coupled to a plurality of motor controllers 65, which are configured to control motors 66 for driving the rotors 52. The flight controller 63 is also coupled to a plurality of sensors 69 that are configured to sense flight characteristics of the aircraft 20, such as horizontal airspeed, vertical airspeed, heading, powerplane attitude, and other flight characteristics that are typically used to control flight of conventional aircraft. The sensors 69 may also sense other parameters useful in controlling the aircraft 20, such as external objects for sensing and avoiding collision threats, temperature, etc. The flight controller 63 is further coupled to a power source 75, which may include one or more batteries for powering the electrical motors and components of the aircraft 20, and a ballistic recovery system (BRS) 72.

The flight controller 63 is configured to control the general operation of the aircraft, including flight, as will be described in more detail below. As an example, the flight controller 63 may be configured to provide control inputs to the motor controllers 65 for controlling the spinning speeds of the blades of the rotors 52 such that they generate thrust as appropriate for controlling the movement of the aircraft 20 in a desired manner. That is, the flight controller 63 instructs each motor controller 65 to operate its respective rotor 52 at a desired speed so that appropriate thrusts are generated for controlling the flight of the aircraft 20. As an example, the rotors 52 may be controlled to generate sufficient lift to counteract the weight of the aircraft 20 such that the aircraft 20 is flown to a desired altitude above ground. Further, differential thrusting of the rotors 52 may be used to control movement of the powerplane assembly 33 about the roll and pitch axes, as is known in the art for conventional multirotor VTOL aircraft, and also to provide horizontal movement of the aircraft 20 as may be desired. Further, differential torque from the rotors 52 may be used control movement of the powerplane assembly 33 about the yaw axis, as is known in the art for conventional multirotor VTOL aircraft.

In addition, in some embodiments, as will be described in more detail below, the powerplane assembly 33 may be coupled to the fuselage 25 via a pivotal coupling 152 (FIG. 15A) that permits the powerplane assembly 33 to pivot about at least two axes relative to the fuselage 25. In such an embodiment, the differential thrusting used to rotate the powerplane assembly 33 about the roll and pitch axes does not cause corresponding movement of the fuselage 25. That is, in some embodiments for which the pivotal coupling 152 couples the powerplane assembly 33 to the fuselage 25, the powerplane assembly 33 rolls and pitches independently of the fuselage 25. However, the powerplane assembly 33 may be indexed to the fuselage 25 about the yaw axis such that it rotates about the yaw axis with the powerplane assembly 33. An exemplary pivotal coupling 152 for achieving this effect will be described in more detail below with reference to FIGS. 15A and 16-19. However, it should be noted that use of such a pivotal coupling 152 is unnecessary, and other types of couplings are possible in other embodiments. As an example, if desired, the fuselage 25 may be designed such that the cabin 31 rotates with the powerplane assembly 33 about roll and/or pitch.

FIG. 6 shows a side view of an embodiment for which the powerplane assembly 33 is coupled to the fuselage 25 through a pivotal coupling 152 (not shown in FIG. 6) that permits the power plane assembly 33 to move independently about roll and pitch relative to the fuselage 25. In FIG. 6, the powerplane assembly 33 has forward pitch resulting from the rotors 52 at the back of the aircraft 20 being controlled to generate more thrust than the rotors 52 at the front of the aircraft 20. In such a configuration, a horizontal component of the thrust generated by the rotors 52 pushes the aircraft 20 forward. FIG. 5 shows a side view of an embodiment having aft pitch resulting from the rotors 52 at the front of the aircraft 20 being controlled to generate more thrust than the rotors 52 at the back of the aircraft 20. In such a configuration, a horizontal component of the thrust generated by the rotors 52 pushes the aircraft 20 backward.

Similarly, the powerplane assembly 33 may be controlled to tilt about the roll axis in a desired manner by controlling the rotors 52 on one side of the aircraft 20 to generate more thrust than the rotors 52 on the other side of the aircraft 20. In such a configuration, a horizontal component of the thrust generated by the rotors 52 pushes the aircraft 20 sideways.

Figure 7:
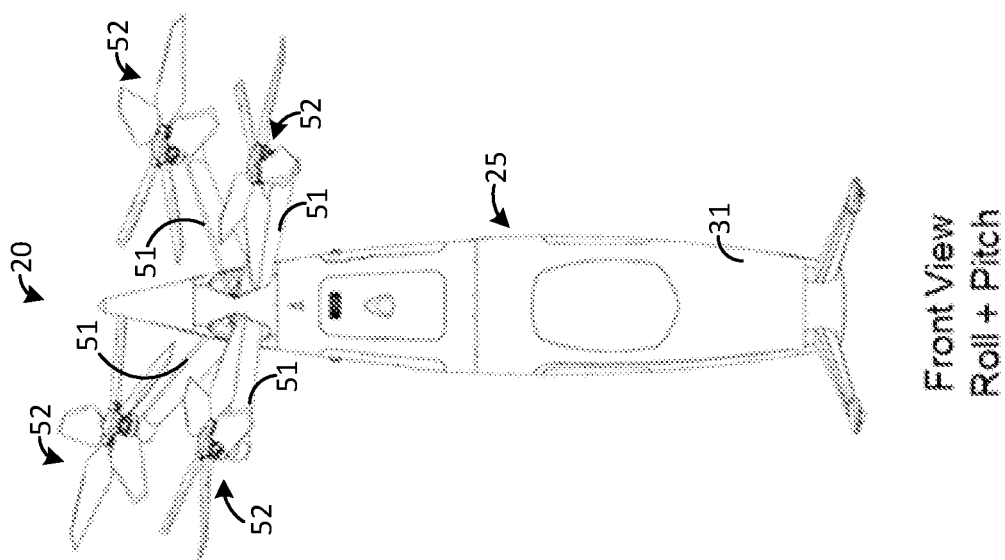
FIG. 7 depicts a front view of the VTOL aircraft of FIG. 1A with a powerplane assembly of the aircraft tilted about the aircraft's pitch axis and roll axis.

Moreover, through differential thrusting as described above, the thrusts generated by the rotors 52 may be controlled such that the powerplane assembly 33 may be simultaneously tilted about the pitch axis and roll axis as desired. For example, FIG. 7 shows the powerplane assembly 33 having about 20 degrees forward pitch and about 10 degrees of roll, thus generating a combined diagonal x/y thrust resultant. Notably, the powerplane assembly 33 is coupled to the fuselage 25 in the Z axis, so that motor torque differential may be used to control aircraft yaw as is known in the art.

The flight controller 63 may be implemented in hardware or a combination of hardware with software and/or firmware. As an example, the flight controller 63 may be implemented with hardware gate logic, such as a field programmable gate array (FPGA), or with application-specific integrated circuits (ASICs). In some embodiments, the flight controller 63 comprises at least one processor, such as a digital signal processor (DSP) or a central processor unit (CPU), that is configured to execute software and/or firmware for performing the functions described herein for the flight controller 63. In other embodiments, other types of controllers 63 may be used.

In some embodiments, the motors 66 are electrical and draw electrical power from the power source 75 during operation. The motors 66 may operate under the control of one or more motor controllers 65, which control the motors 66 in order to control the spinning speeds of the blades of the rotors 52 as instructed by the flight controller 63. In some embodiments, the aircraft 20 is autonomous, and the flight controller 63 controls flight of the vehicle 20, including both navigation and aviation, without the use of or inputs from a pilot. However, in other embodiments, a pilot onboard the aircraft 20 may provide control inputs for controlling flight. Such inputs may be received by the flight controller 63, which interprets such inputs to provide appropriate control signals to the motor controllers 65. If desired, such inputs may be received from a remote pilot via wireless communication. Yet other techniques and configurations for controlling the flight of the aircraft 20 are possible in other embodiments. It is also possible to drive the rotors 52 with other types of motors.

Figure 8C:
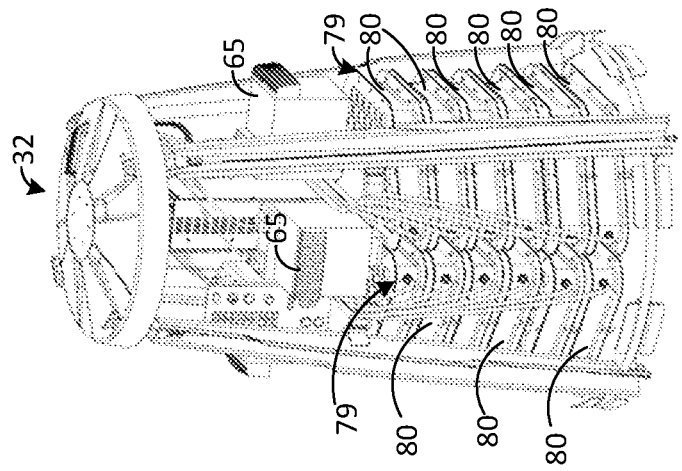
FIG. 8C depicts a perspective view of the power module depicted by FIG. 8A, showing internal components including batteries and motor controllers.
Figure 8B:
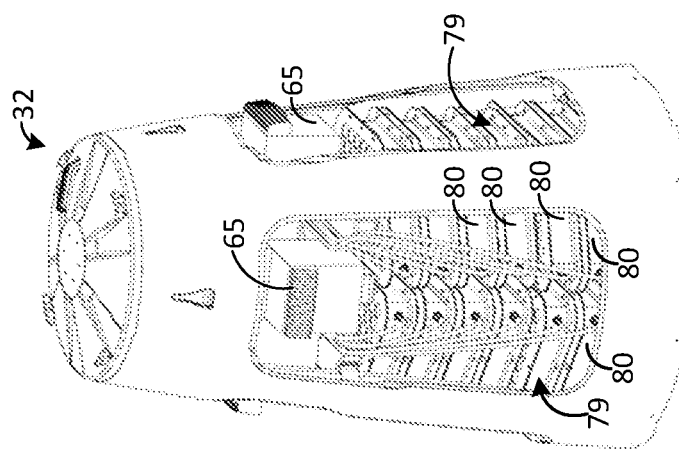
FIG. 8B depicts a perspective view of the power module depicted by FIG. 8A with access panels removed.
Figure 8A:
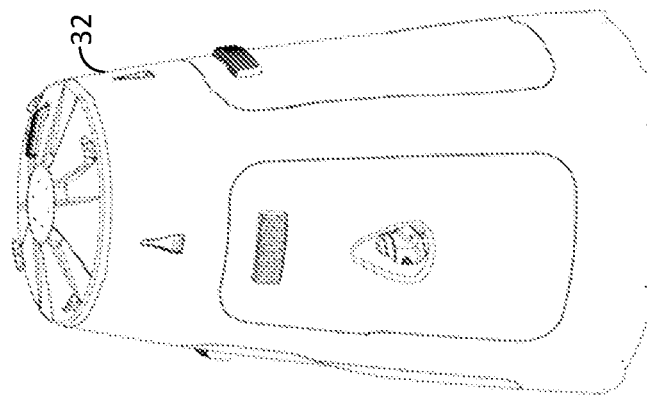
FIG. 8A depicts a perspective view of an embodiment of a power module.

The powerpack assembly 32 houses the power source 75 (FIG. 4) and motor controllers 65, as shown by FIGS. 8A and 8B. In one embodiment, the power source 75 comprises a plurality of battery packs 80 that are positioned just below the motor controllers 65, as shown by FIGS. 8B and 8C. In other embodiments, other types of power sources 75 may be used, and the relative positions of the battery packs 80 and the motor controllers 65 may be different. In the embodiment shown by FIGS. 2, 8A, and 8B, the powerpack assembly 32 is located below the powerplane assembly 33, including the motors 66 and rotors 52. By locating the battery packs 80 and motor controllers 65 just below the powerplane assembly 33, the lengths of electrical wiring between the battery packs 80, motor controllers 65, and rotor motors 66 can be kept relatively short, thereby helping to minimize the electrical resistance and weight of such wiring. In some embodiments, the powerpack assembly 32, which comprises the battery packs 80, the motor controllers 65, and the flight controller 63, can be removed from the fuselage 25 and replaced with a new powerpack assembly 32.

In one embodiment, the powerpack assembly 32 comprises 812 battery cells providing a total power of approximately 71 kilowatt hours (kWh), although other numbers of cells and amounts of available power are possible. These cells are arranged in several interconnected battery packs 80 where each pack 80 comprises a plurality of cells. In the embodiment shown by FIG. 8C, the battery packs 80 are arranged into two vertically-stacked towers 79. The battery packs 80 may be stacked in other arrangements, and other numbers of battery pack towers 79 may be used in other embodiments.

In some embodiments, each battery pack tower 79 is electrically connected to each motor 66 for driving the rotors 52 so that each motor 66 may receive power from either or both of the towers 79. In addition, each battery pack tower 79 is able to generate sufficient power to drive simultaneously all of the motors 66 without power from the other tower 79, if desired. Thus, in the event of an operational problem with one of the towers 79, the other tower 79 should provide sufficient power for all of the motors 66 for at least enough time for the aircraft 20 to continue to the destination or perform an emergency landing. However, in other embodiments, other types and arrangements of batteries may be used.

Figure 15A:
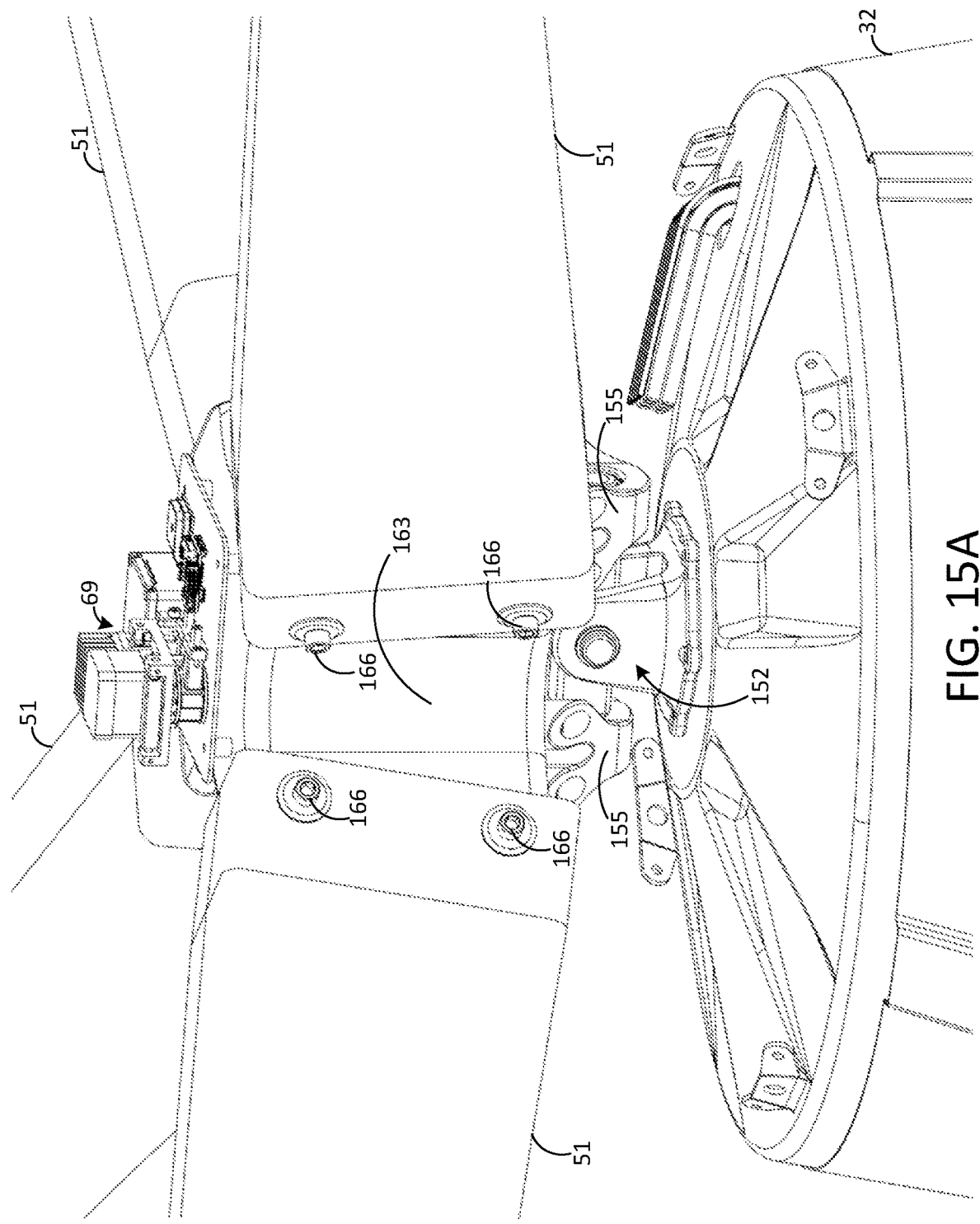
FIG. 15A depicts a perspective view of a pivotal coupling that connects a powerplane assembly to a power module of VTOL aircraft, such as is depicted by FIG. 1A.
Figure 15B:
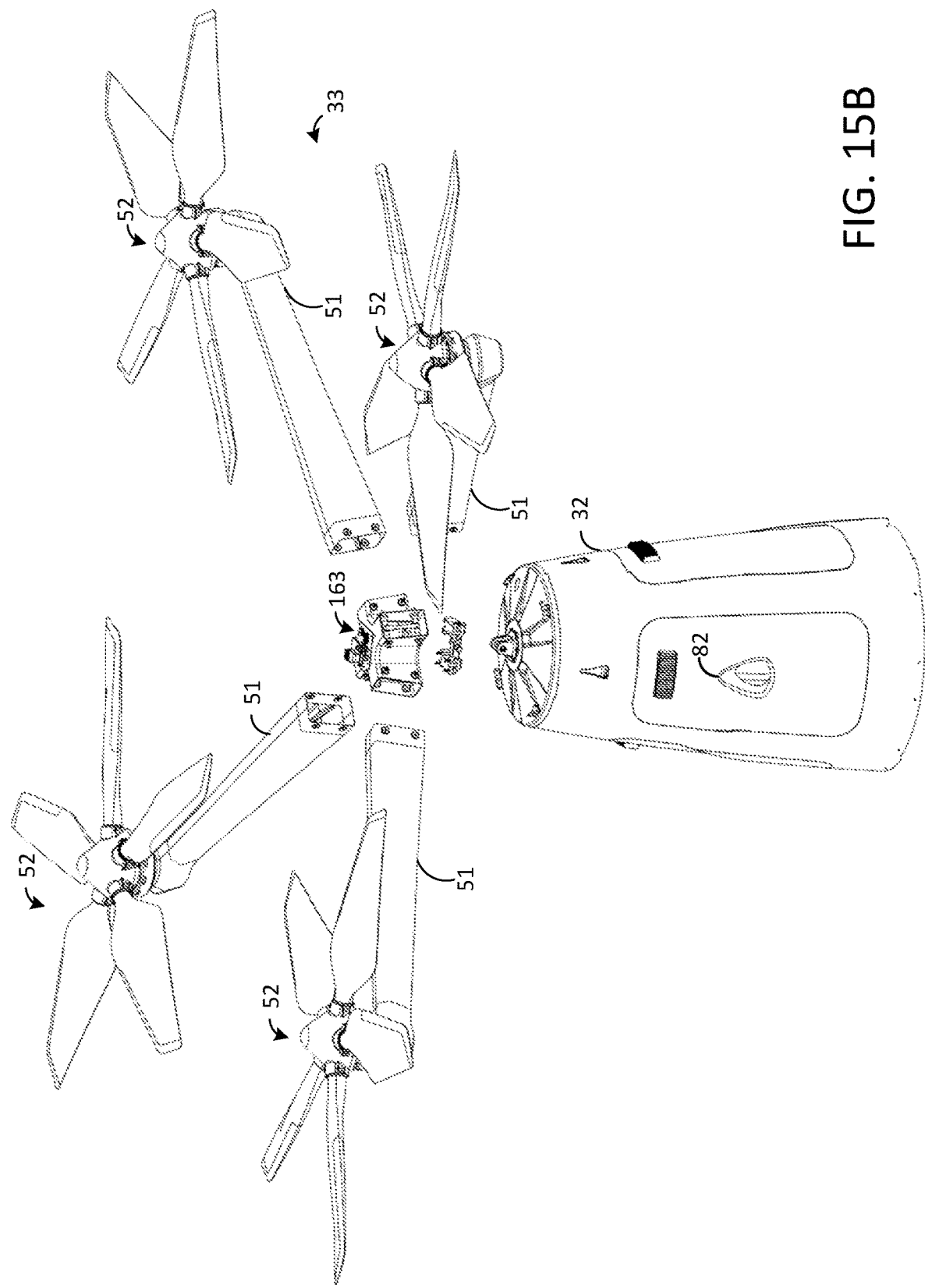
FIG. 15B depicts an exploded view of the pivotal coupling depicted by FIG. 15A.

As shown by FIGS. 1C and 15B, an intake duct 82 is located in the powerpack assembly 32 of the fuselage 25 to receive cooling air from the rotors 52. The air travels from this intake duct 82 through the powerpack assembly 32 and exits the powerpack assembly 32 via an outlet duct 85 (FIGS. 1B and 1D) that is located on an opposite side of the fuselage 25 relative to the intake duct 82. The outlet duct 85 may be fed by a cooling fan, creating negative pressure within the powerpack assembly 32 to aid the intake flow. As the air is passing through the powerpack assembly 32, it absorbs heat from the battery packs 80 and other electronics, and then is expelled through the outlet duct 85, thereby ensuring the electronic equipment is maintained at its designed operating temperature.

In the event of a fire in the powerpack assembly 32, the vertical orientation of the fuselage 25 ensures that the passenger cabin 31 is well positioned below the smoke, heat or flame that may rise from such a fire. Additionally, passenger cabin 31 is separated from the battery packs 80 by two bulkheads, each of which may be designed according to applicable aviation fire-resistance regulations, in order to ensure that the aircraft 20 reaches the ground and the passenger safely exits before the fire is able to penetrate the cabin 31. For example, from an altitude of 500 feet above ground level (AGL) with a BRS descent rate of 10 fps, the fire-resistant bulkhead system would need to remain intact for at least 50 seconds, well within the capabilities of modern fire-resistant materials.

Figure 9:
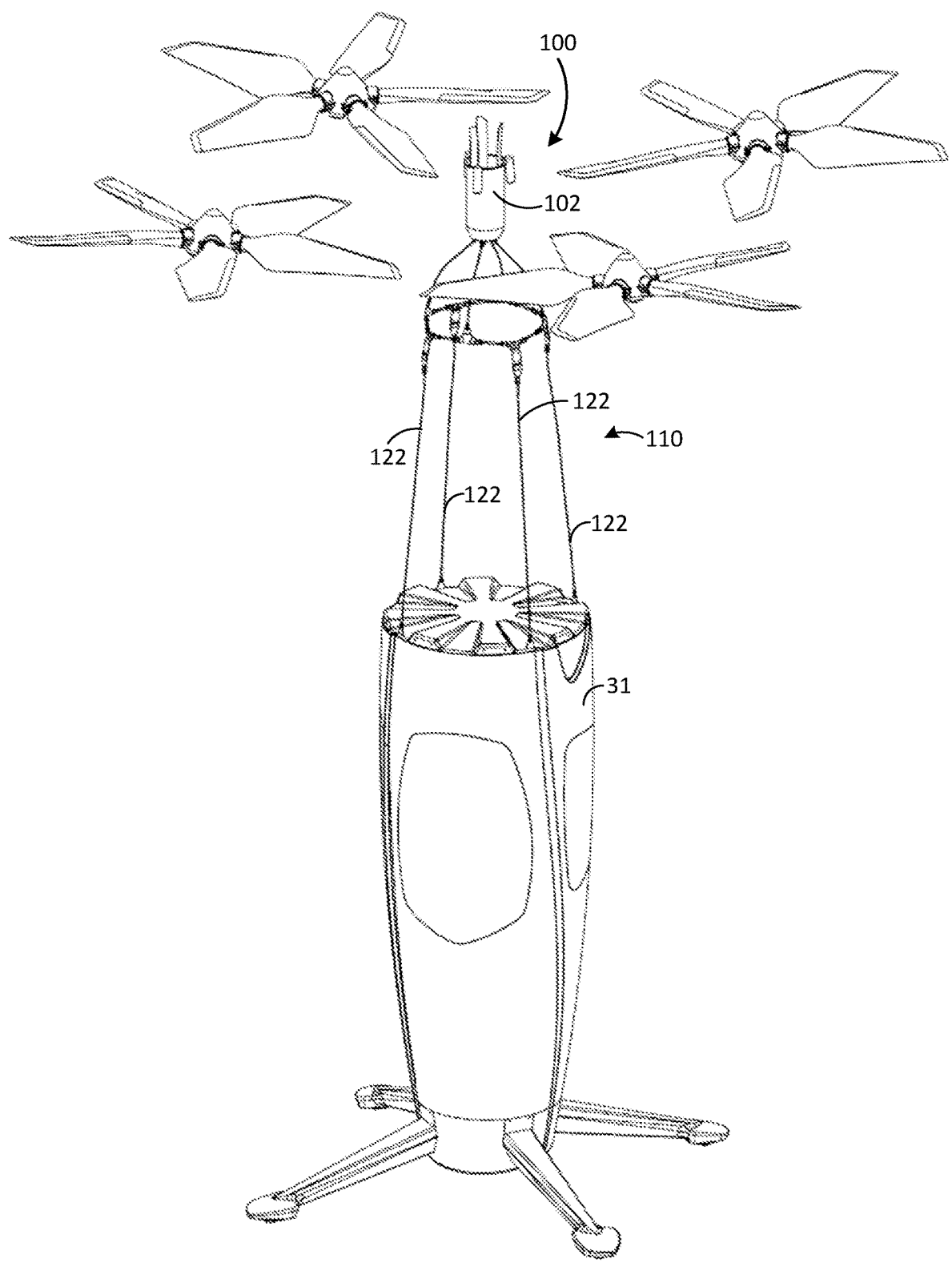
FIG. 9 depicts a perspective view of an embodiment of a ballistic recovery system.
Figure 10:
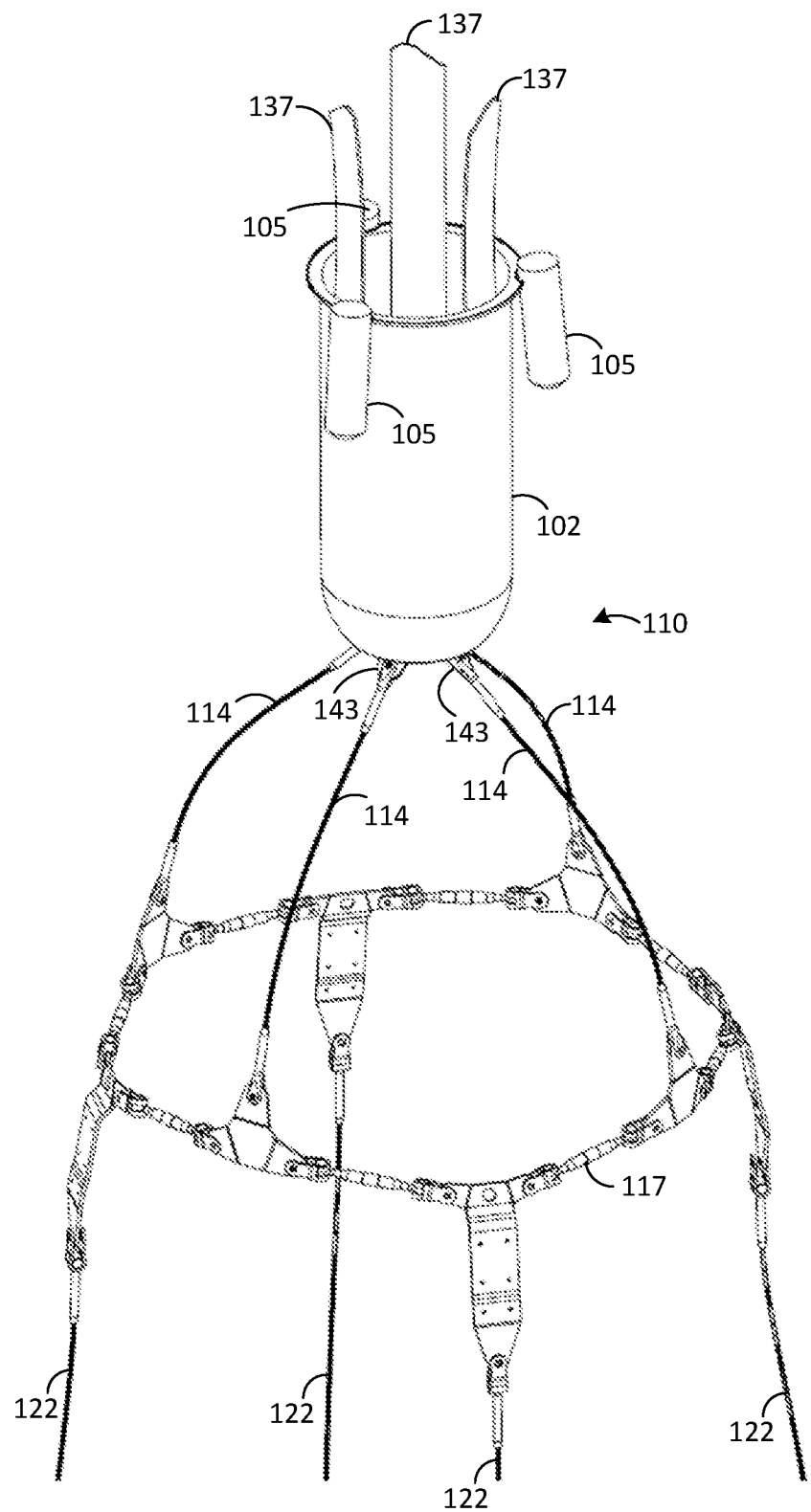
FIG. 10 depicts a harness for a ballistic recovery system, such as is depicted by FIG. 9.
Figure 11A:
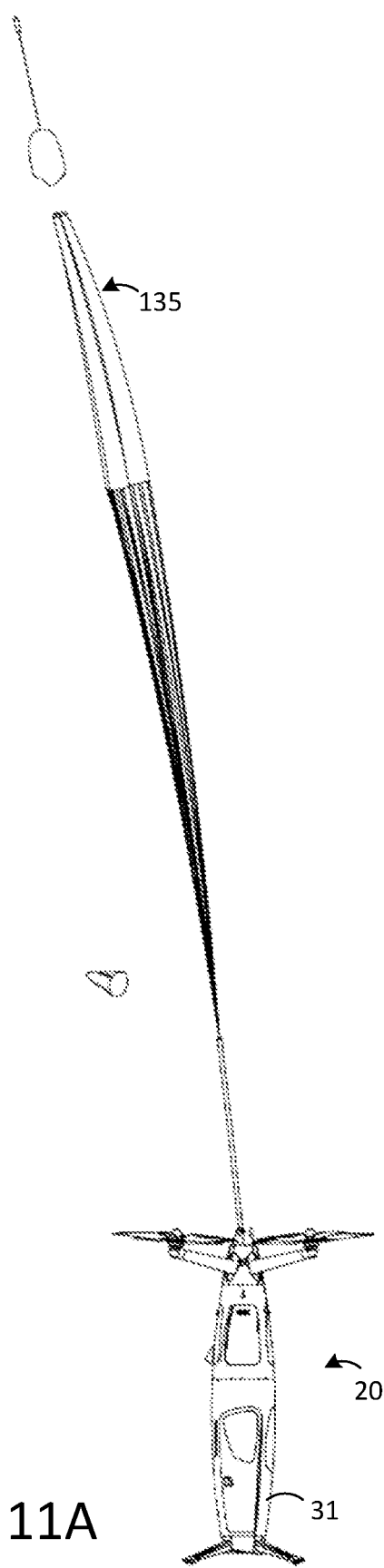
FIG. 11A depicts the VTOL aircraft of FIG. 1A as parachutes of a ballistic recovery system are being deployed.
Figure 11B:
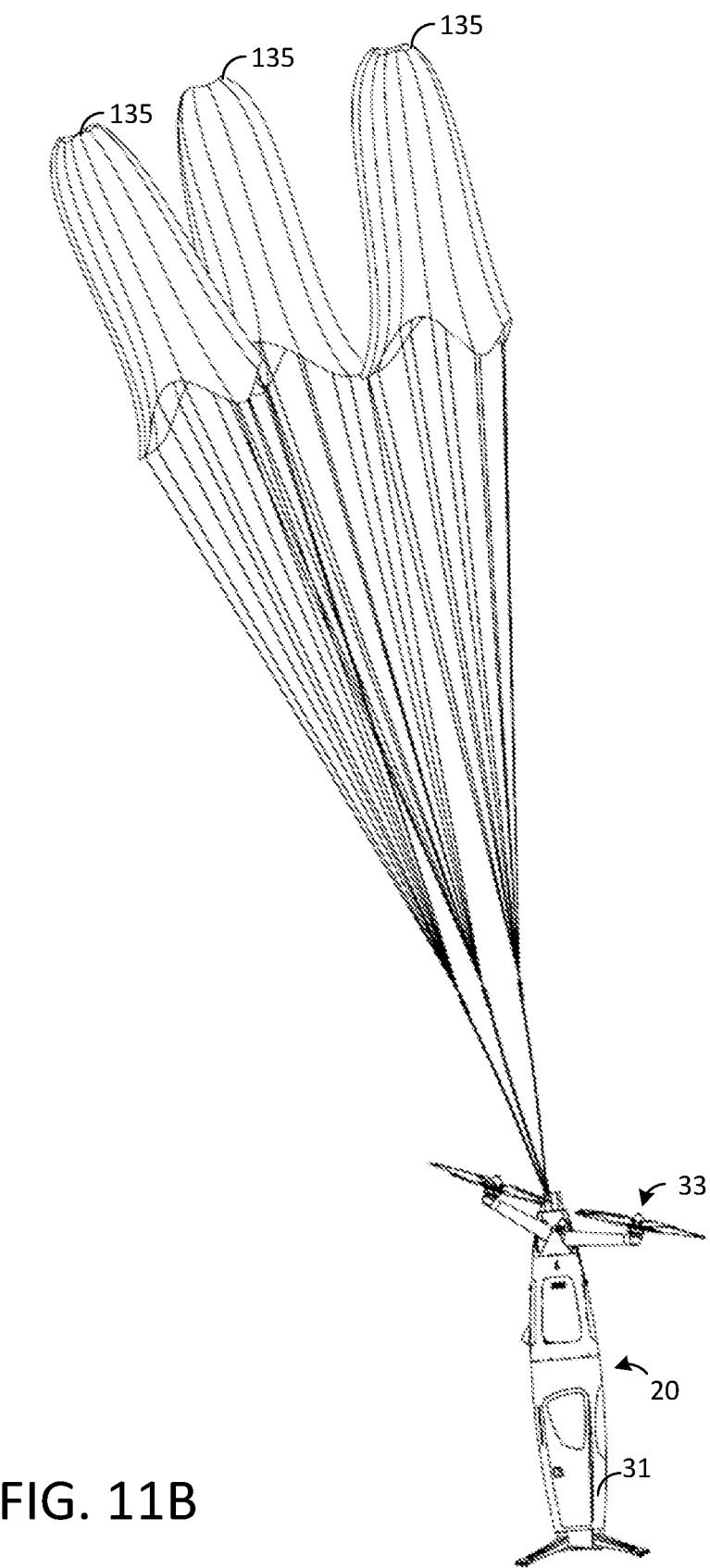
FIG. 11B depicts the VTOL aircraft of FIG. 11A after the depicted parachutes have been further deployed.
Figure 11C:
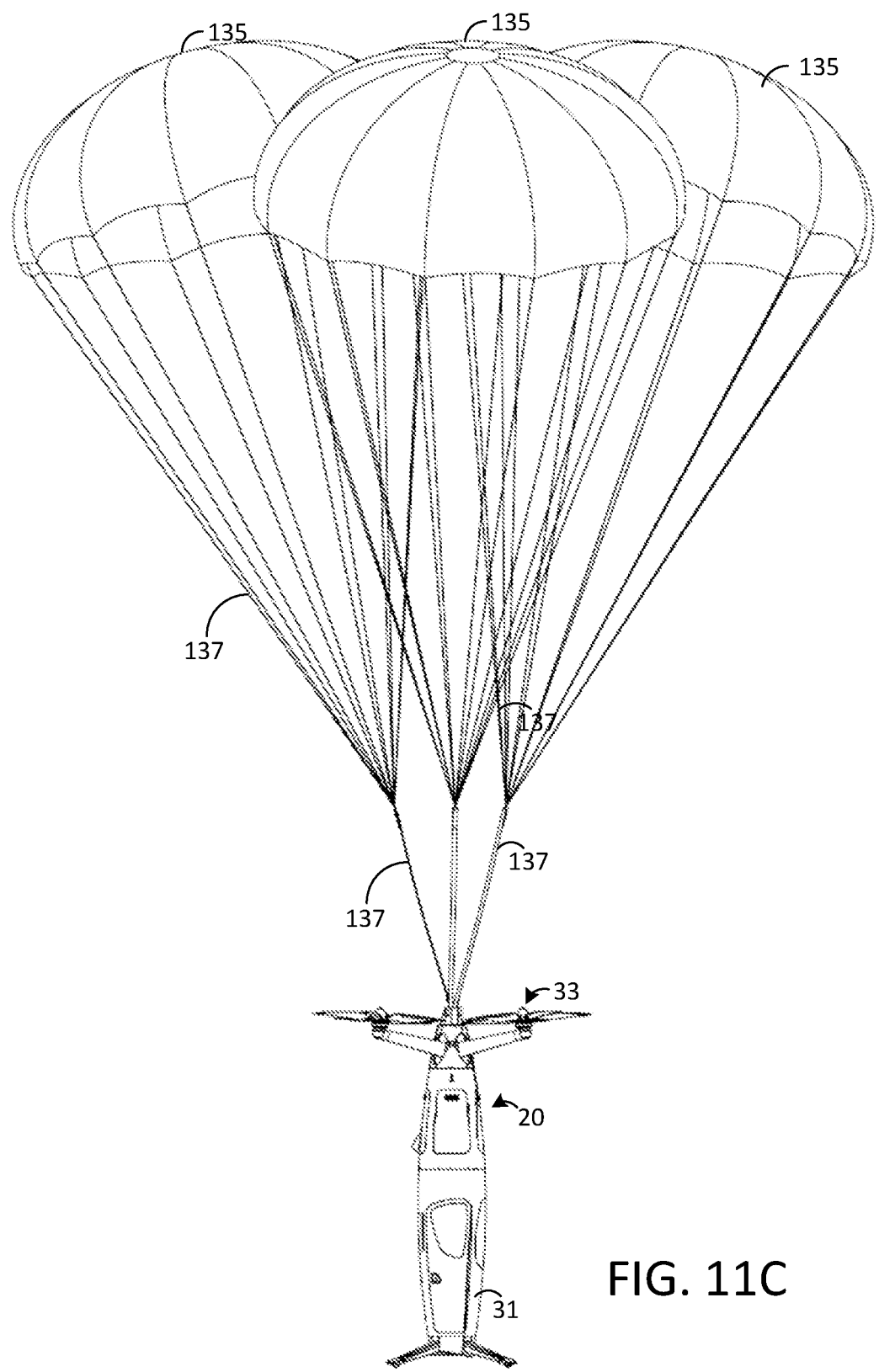
FIG. 11C depicts the VTOL aircraft of FIG. 11B once the parachutes have fully deployed.

As shown by FIGS. 9 and 10, in some embodiments, the aircraft 20 may have a ballistic recovery system (BRS) 100 that can deploy one or more parachutes 135 (FIGS. 11A-11C) in the event of a failure of one or more components (e.g., rotors 52) or other operational problem. The BRS 100 has a hollow container 102, referred to hereafter as "chute can," for holding the parachutes 135. Mounted on the chute can 102 are one or more rocket holders 105 (FIG. 10) for holding rockets (not shown in FIGS. 9 and 10) that are deployed in the event of an emergency event, such as failure of one or more rotors 52 or detection of a fire. When an emergency event is detected by the flight controller 63, it transmits a control signal for causing the rockets in the rocket holders 105 to be deployed. In response, the rockets are activated so that they fire out of the holders 105 upward (generally in the z-direction) either breaking through the nose 34 or forcing the nose 34 off of the aircraft 20 and pulling the parachute or parachutes 135 out of the chute can 102. The parachutes 135 then open to provide significant drag as the aircraft 20 falls to the ground. FIGS. 11A-11C depict a progression of three parachutes 135 being deployed. In other embodiments, other numbers of parachutes 135 may be used.

As shown by FIGS. 9 and 11A-11C, each parachute 135 is coupled by one or more parachute lines 137 to the cabin 31 via a cabin bridle 110, as will be described in more detail below. Since the parachute lines 137 are coupled to the top of the cabin 31 as shown, deployment of the parachutes 135 should not materially change the attitude of the cabin 31, helping to make parachute deployment relatively smooth for the passenger.

In some embodiments, the parachutes 135 provide sufficient drag to limit the descent rate of the aircraft 20 to about 10 feet per second (fps). Thus, at low altitudes of about 500 feet above ground or less, the aircraft 20 should reach the ground in under 50 seconds after parachute deployment. In other embodiments, parachutes 135 providing other descent rates and other types of recovery systems for recovering from an emergency condition are possible.

As noted above and referring to FIG. 10, parachute lines 137 may connect to the cabin 31 through a cabin bridle 110. In this regard, the cabin bridle 110 has a plurality of cables made of high-strength steel wire rope that pass around the booms 51 and thru the powerpack assembly 32 (FIG. 1A) and connect to the passenger cabin 31, thus establishing a direct connection between each parachute 135 and the passenger cabin 31. In the embodiment depicted by FIG. 10, the bridle 110 comprises a plurality of cables 114 that connect the parachute lines 137 to a cabling loop 117 that connects to cables 122, which pass thru the powerpack assembly 32 and connect directly to the passenger cabin 31.

In some embodiments, the parachute lines 137 may couple to the bridle 110 through a coupling assembly having one or more couplers 143 that may be mounted on, attached to, or pass through the chute can 102 and that connect the cables 114 to the parachute lines 137. The material selected for the cabling loop 117 and the cables 114, 122 is preferably capable of withstanding heat from a fire over a sufficient period of time to allow the aircraft 20 to reach the ground. As noted above, for altitudes of about 500 feet or less, it may take less than 50 seconds for the aircraft 20 to reach the ground after detection of an emergency condition and deployment of the parachute.

In some embodiments, each cable 114, 122 may be designed to support the expected weight of the aircraft 20 such that the BRS 100 remains operational for keeping the cabin 31 connected to the parachutes 135 as along as at least one cable 122 and at least one cable 114 remain connected. Thus, if a fire or other event severs other cables 114 and 122, the cabin 31 can still reach the ground at a safe speed. In other embodiments, other types of harnesses 100 and other harness configurations may be used. In addition, other types of recovery systems are possible, and the use of a BRS 100 or other type of recovery system is unnecessary in all embodiments.

Figure 12:
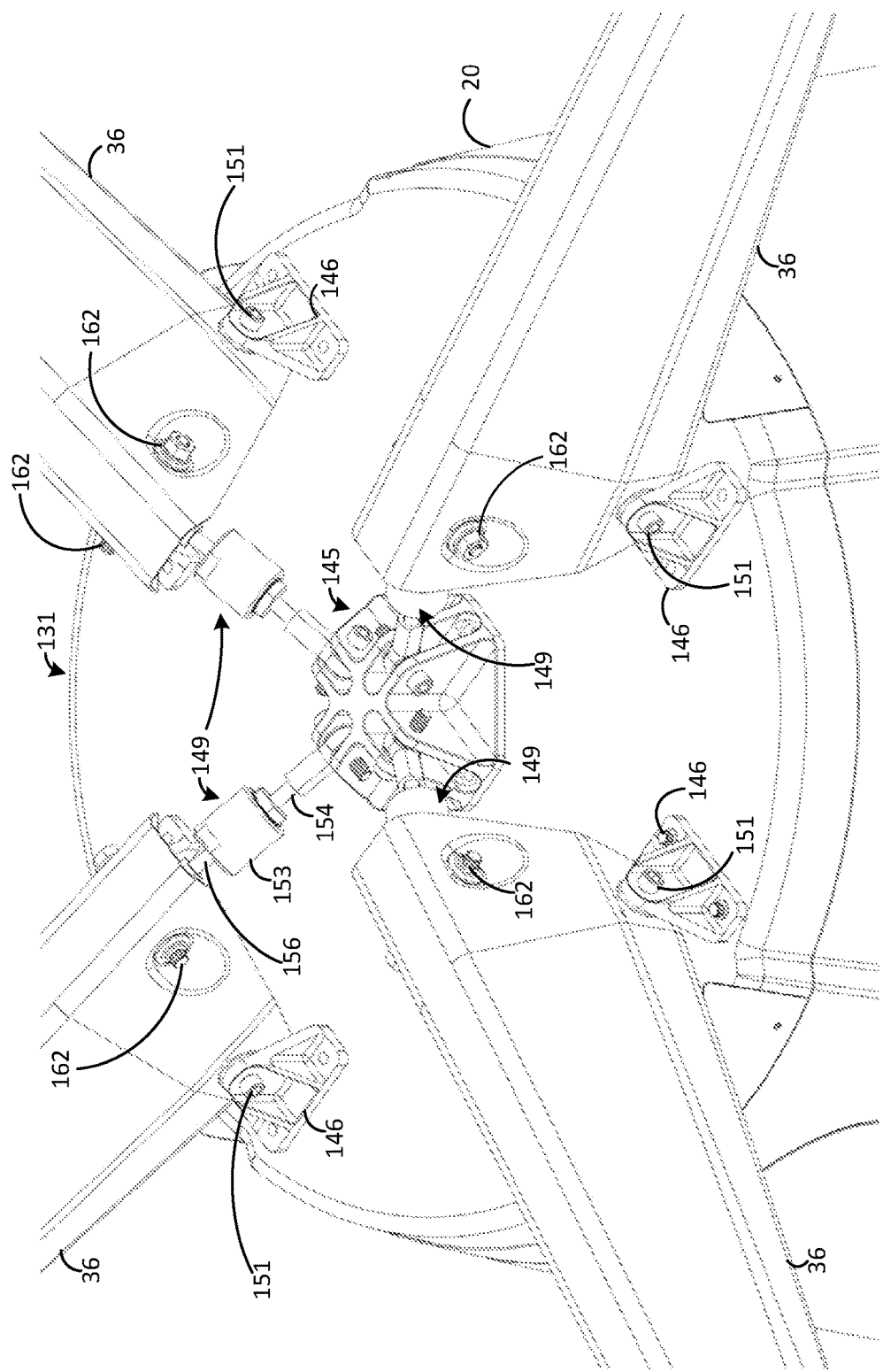
FIG. 12 depicts a perspective view of a base of the fuselage of the VTOL aircraft depicted by FIG. 1A.

FIG. 12 depicts a base 131 of the fuselage 25 that is located below the cabin floor 38 (FIG. 2) on which a passenger may stand or sit. A bottom surface of the base 131 is coupled to a bracket 145, referred to hereafter as "center bracket," and a plurality of brackets 146, referred to hereafter as "perimeter brackets," positioned close to a perimeter of the base 131. Each leg 36 is coupled to the center bracket 145 and at least one perimeter bracket 146. Further, the center bracket 145 is coupled to an end of each leg 36 by an elastic coupling 149 that is designed to provide an adjustable length to permit rotation of the leg 36 to which it is coupled, as will be described in more detail below. In this regard, the elastic coupling 149 may be composed of an elastic material that permits the coupling 149 to stretch, or the elastic coupling 149 may be implemented with a spring or other type of device that permits the coupling 149 to stretch under tension. An exemplary elastic coupling 149 will be described in more detail below with reference to FIGS. 13A-D.

As shown by FIG. 12, each leg 36 is coupled to a respective pair of perimeter brackets 146 in some embodiments. In this regard, for each perimeter bracket 146, a pin 151 passes through the bracket 146 and the leg 36 to which it is coupled, and the leg 36 may pivot about the pin 151. Note that the same pin 151 may pass through both perimeter brackets 146 coupled to the same leg 36, or a separate pin 151 may be used for each perimeter bracket 146.

Figures 13A, 13B, 13C, 13D:
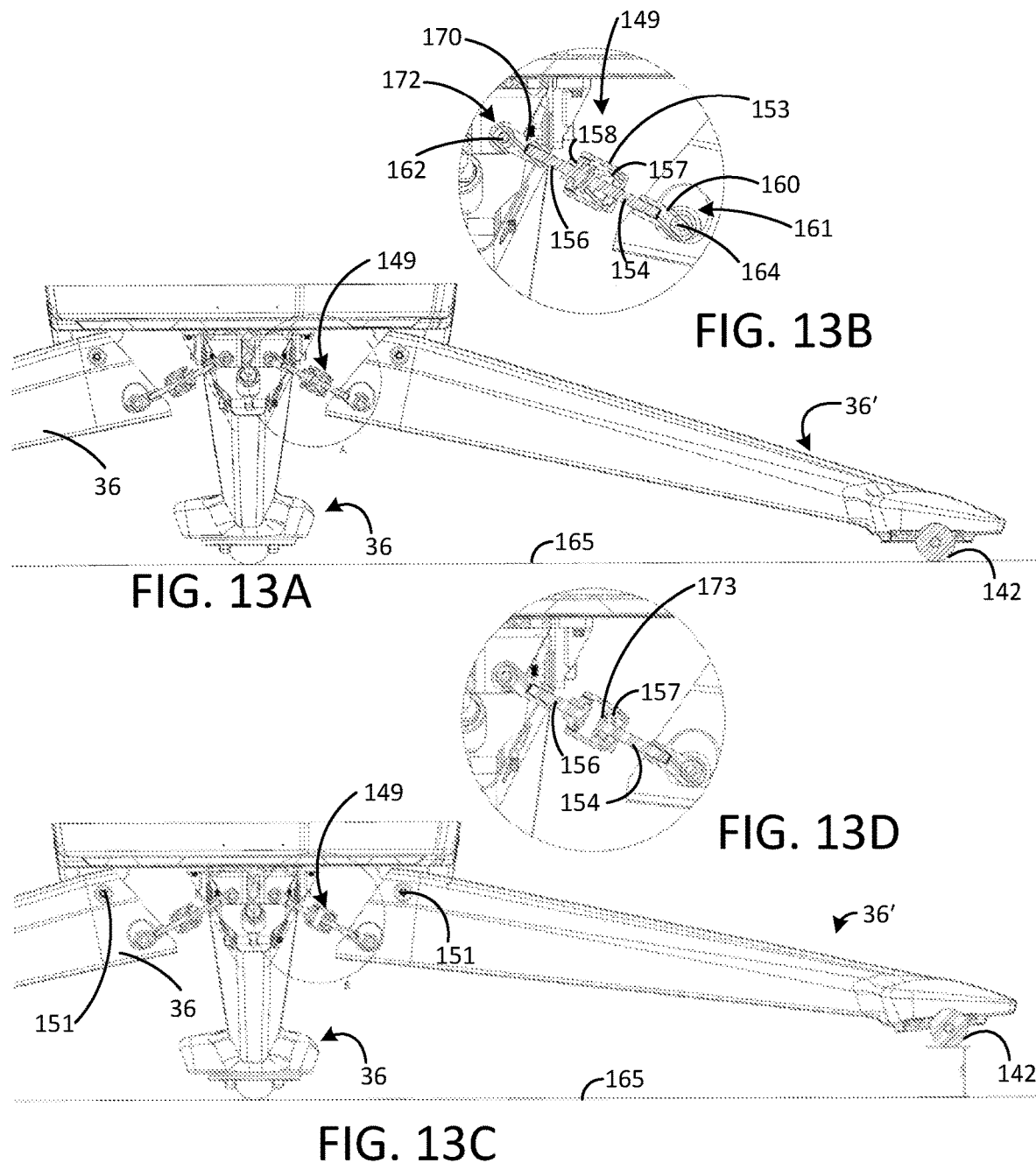
FIG. 13A depicts a side view of landing gear coupled to the base of the fuselage depicted by FIG. 12.
FIG. 13B depicts an elastic coupling of a suspension system for the landing gear depicted by FIG. 13A.
FIG. 13C shows the landing gear of FIG. 13A after foot of the landing gear has been moved relative to the fuselage 25.
FIG. 13D depicts the elastic coupling of FIG. 13B after the foot of the landing gear has been moved, as shown by FIG. 13C.

The brackets 145, 146, elastic coupling 149, and pins 151 form a suspension system that permits the legs 36 to move relative to the fuselage 25 when they contact ground. In this regard, FIG. 13A shows the landing gear prior to a leg 36' making contact with the ground during landing. FIG. 13C shows the landing gear after the leg 36' makes contact with the ground causing the leg 36' to move relative to the fuselage 25 and the other legs 36, as shown by the separation of the leg 36' from a reference plane 165. To permit the leg 36' to move upward, the leg 36' pivots about the pin 151 that is used to couple it to the base 131. Rotation about this pin 151 puts the elastic coupling 149 in tension such that the length of the coupling 149 is increased. However, the elastic coupling 149 is designed to resist this movement such that once the force applied from the ground is removed (e.g., after takeoff) a force generated by the elastic coupling 149 is sufficient to cause the leg 36' to rotate back to its original position shown by FIG. 13A.

As best shown by FIG. 13B, the elastic coupling 149 has a pair of rods 154, 156 that pass through a can 153. Positioned within the can 153 is an elastic bumper 157 through which an end of the rod 154 passes. The elastic bumper 157 is composed of an elastic material, such as rubber, that allows the bumper 157 to deform under an applied force, but the material of the bumper 154 resists such deformation and returns to its original shape when the applied force is removed.

The opposite end of the rod 154 is positioned within a sleeve 160 of a rod end spherical bearing 161, also referred to as a "Heim joint." The bearing 161 has a pin 164 around which the sleeve 160 is permitted to rotate thereby accommodating slight angular changes between the rod 154 and the leg 36' as the leg 36' rotates.

The can 153 also has a cap 158 through which the rod 156 passes. The opposite end of the rod 156 is positioned within a sleeve 170 of a rod end spherical bearing 172. The bearing 172 has a pin 162 around which the sleeve 170 is permitted to rotate thereby accommodating slight angular changes between the rod 156 and the center bracket 145 as the leg 36' rotates.

Rotation of the leg 36' relative to the fuselage 25 presses a head 173 (FIG. 1D) of the rod 154 against the elastic bumper 157 causing the elastic bumper 157 to deform. Such deformation permits the rod 154 to move relative to the can 153 in a direction toward the rotating leg 36' such that the overall length of the elastic coupling 149 is increased, as shown by FIG. 13D. Thus, when the leg 36' contacts the ground, the leg 36' rotates relative to the fuselage 25 about the pin 151 to which it is coupled, thereby putting the elastic coupling 149 under tension such that its overall length is increased.

Once the bumper 157 is fully deformed, further movement of the rod 154 relative to the cam 153 is prevented thereby preventing further rotation of the leg 36' relative to the fuselage 25. In some embodiments, about half of an inch extension of the elastic coupling 149 translates into about three inches of movement of the end of the leg 36', but other ratios of movement are possible in other embodiments.

During takeoff, the force applied to the leg 36' by the ground is reduced and eventually removed entirely. As this force is reduced, the deformation of the bumper 157 provides a force that tends to push the head 173 of the rod 154 away from the leg 36' to which it is coupled so that the bumper 157 can return to its original shape, thereby decreasing the overall length of the elastic coupling 149. This force is sufficiently strong to cause the leg 36' to rotate about the pin 151 in the opposite direction as before such that the leg 36' is rotated back to its original prior to the previous contact with the ground.

Note that the other legs 36 may be similarly configured such that they also are permitted to rotate relative to the fuselage 25 when they make contact with the ground and during takeoff, as described above. This permitted movement of the legs 36 relative to the fuselage 25 has many benefits, such as providing for a smoother landing relative to an embodiment for which the legs 36 are rigidly mounted to the fuselage 25. In addition, the permitted movement of the legs 36 may provide for safer landings for which the risk of toppling of the aircraft 20 is reduced by helping to accommodate for slight attitude misalignments of the fuselage 25 relative to the ground. This may be particularly advantageous for aircraft with relatively high aspect ratios of the fuselage or rotors, as described above, given that a higher fuselage or powerplane aspect ratio may have the effect of increasing the height of the aircraft's center of mass.

As shown by FIGS. 14A and 14B, the distal end of each leg 36 away from the fuselage 25 may have a roller 142. In one embodiment, the roller 142 is a self-castering roller mounted inside a large diameter, thin section bearing, and the roller 142 is capable of rolling in any direction (360 degrees) on the surface of the ground after landing, thereby helping to facilitate suspension function and ground handling. In other embodiments, other types of rollers and configurations of the legs 36 are possible. As an example, it is possible for the legs 36 not to have rollers or otherwise be configured for rolling.

Figure 16:
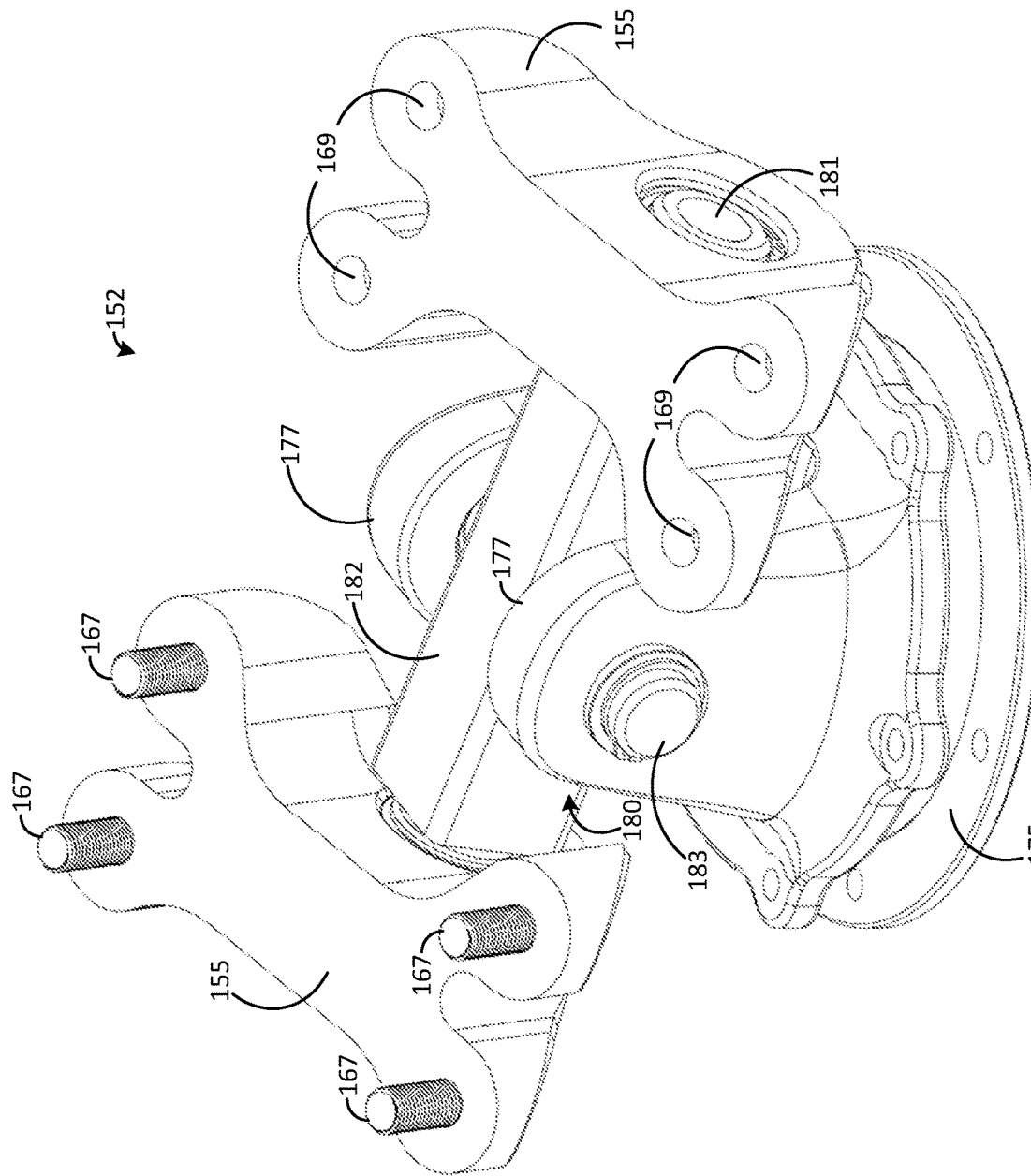
FIG. 16 depicts a perspective view of the pivotal coupling depicted by FIG. 15A.

Referring to FIGS. 15A and 15B, the powerplane assembly 33 is connected to the powerpack assembly 32 by pivotal coupling 152, which in some embodiments is implemented with a biaxial connector, though other types of couplings may be used in other embodiments. The pivotal coupling 152, when implemented as a biaxial connector, functions like a U-joint and in this embodiment has a pair of pillow blocks 155 that are attached to a boom mount 163, which is connected to the booms 51 as shown by FIG. 15A. In this regard, bolts 166 or other couplers may be used to attach each boom 51 to the boom mount 163, and bolts 167 (FIG. 16) or other couplers may be used to attach the pillow blocks 155 to the boom mount 163. As an example, each pillow block 155 may have holes 169 (FIG. 16) through which a respective bolt 167 or other coupler may pass and extend into the boom mount 163 in order to secure the boom mount 163 to the pillow block 155. In this embodiment, the boom mount 163 does not move relative to each pillow block 155. FIG. 16 shows the pillow blocks 155 with bolts 167 inserted in one of the pillow blocks and the other pillow block 155 without bolts 167 inserted for illustrative purposes.

Note that a biaxial connector generally refers to a connector that permits independent or separate pivoting about two axes. As an example, in the pivotal coupling 152, the boom mount 163 and, thus, powerplane assembly 33 are permitted to pivot about the pin 183 for rotation about a first axis and to pivot about one or more pins 181 for rotation about a second axis, as will be described in more detail below. In other embodiments, other types of biaxial or non-biaxial couplings may be used to pivotally connect the powerplane assembly 33 to the fuselage 25. As an example, hinges, spherical bearings or other types of mechanical couplings may be used to permit pitch and roll of the powerplane assembly 33. In some embodiments, a compliant, flexible coupling may be used to connect the powerplane assembly 33 to the fuselage 25. Such a coupling may comprise rubber, wire rope, webbing, or other type of compliant, flexible coupling to permit relative movement of the powerplane assembly 33 and the fuselage 25 about one or more axes. Yet other types of couplings are possible in other embodiments.

Note that one or more sensors 69 (FIG. 15A), such as an inertial measurement unit, may be mounted on the boom mount 163 and/or other components of the powerplane assembly 33 for sensing the orientation (e.g., inclination) of the powerplane assembly 33. As an example, one inclinometer may be attached to the boom mount 163 or other component of the powerplane assembly 33 to sense the angle of the powerplane assembly 33 relative to the roll axis, and another inclinometer may be attached to the boom mount 163 or other component of the powerplane assembly 33 to sense the angle of the powerplane assembly 33 relative to the pitch axis. In other examples, other types of sensors may be used to sense the orientation of the powerplane assembly 33 or make other types of measurements.

Figures 17, 18, 19:
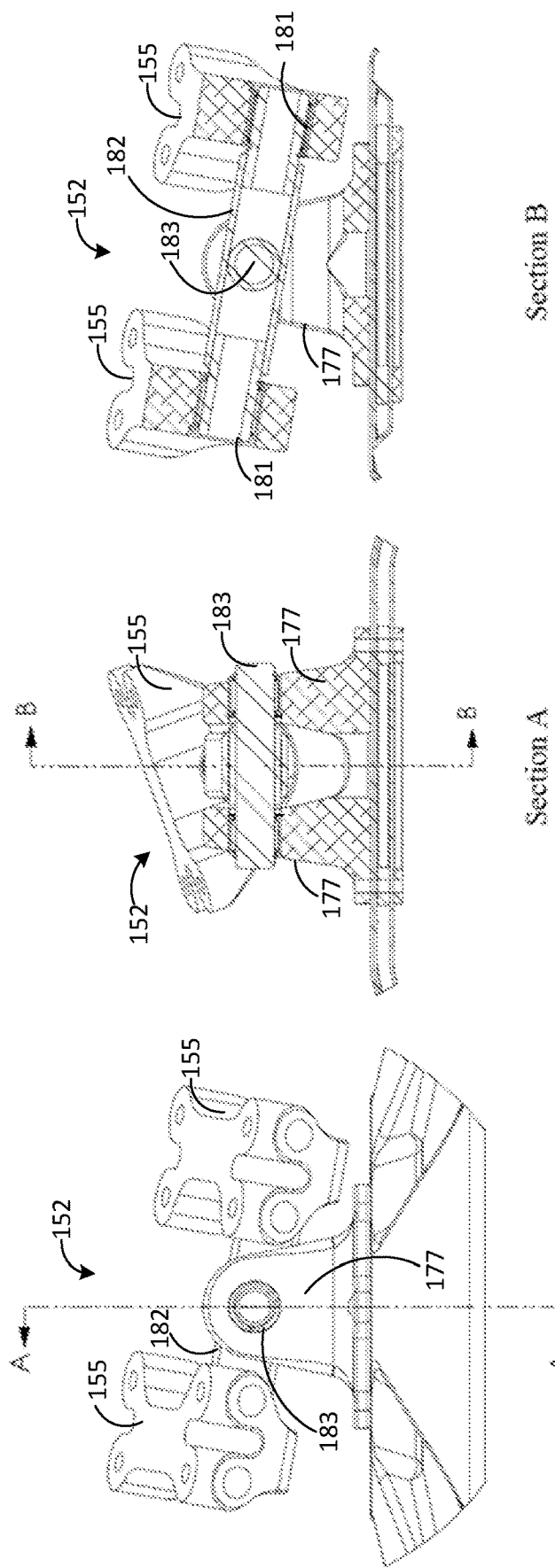
FIG. 17 depicts a side view of the pivotal coupling depicted by FIG. 16.
FIG. 18 depicts a cross-sectional view of the pivotal coupling depicted by FIG. 16 taken along the cut lines shown by FIG. 17.
FIG. 19 depicts a cross-section view of the pivotal coupling depicted by FIG. 16 taken along the cut lines shown by FIG. 18.

As shown by FIGS. 16 and 17, the pivotal coupling 152 has a yoke 175 that is rigidly mounted on the powerpack assembly 32 of the fuselage 25. That is, the yoke 175 does not move relative to the powerpack assembly 32 thereby preventing the powerplane assembly 33 from rotating about the yaw axis (Z) relative to the fuselage 25. Thus, the powerplane assembly 33 and the fuselage 25 rotate in unison about the yaw axis during flight.

The yoke 175 comprises a pair of brackets 177 that protrude from a surface of the yoke 175 forming a space between the brackets 177. The pillow blocks 155 are connected to each other by a cross 180 having a sleeve 182 and a pin 183, which passes through the sleeve 182 and each bracket 177. The sleeve 182 passes through the space between the brackets 177 and may rotate about the pin 183 thereby permitting the powerplane assembly 33, including the rotors 52, to rotate about the pitch axis.

A respective pin 181 (which is hollow in one embodiment but may be solid) extends from each end of the sleeve 182 and passes through a pillow block 155. In the embodiment depicted by FIGS. 16 and 17, separate pins 181 extend from each end of the sleeve 182. Each pillow block 155 may rotate about the respective pin 181 passing through it thereby permitting the powerplane assembly 33, including the rotors 52, to rotate about the roll axis. FIG. 18 shows a cross-sectional view of the pivotal coupling 152 along the cut lines depicted by FIG. 17, and FIG. 19 shows a cross-sectional view of the pivotal coupling 152 along the cut lines depicted by FIG. 18.

Notably, the use of a pivotal coupling 152 that allows the fuselage 25 (e.g., the powerpack assembly 32 and the cabin 31) to hang from a pivot point, as described herein, is relatively simple and much less expensive than other VTOL designs that use tilting rotors or tilting wings. Indeed, many tilt rotor or tilt wing configurations require actuators and complex feedback circuits for actively moving a wing or rotor to a desired orientation relative to the fuselage. In the instant embodiment, the thrust generated by the rotors 52 is used to position the powerplane assembly 33 at a desired attitude for flight, and there is no need for a separate actuator to control the orientation of the powerplane assembly 33 relative to the fuselage 25. Instead, the fuselage 25 freely hangs from the pivotal coupling 152, and gravity holds the fuselage 25 in an upright configuration while the powerplane assembly 33 is rotated about the pitch axis and roll axis via differential thrust generated by the rotors 52 as may be desired. That is, the powerplane assembly 33 rolls and pitches relative to the fuselage 25 when differential thrusts by the rotors 52 change the attitude of the powerplane assembly 33 while the fuselage 25 passively hangs from the pivotal coupling 152 in an upright orientation.

By allowing the powerplane assembly 33 to pivot passively relative to the fuselage 25 (e.g., the cabin 31), it is possible to control the attitude of the powerplane assembly 33 in a manner conducive for optimizing flight while the fuselage 25 (e.g., the powerpack assembly 32 and the cabin 31) essentially hangs from the pivotal coupling 152 with a substantially upright orientation. That is, pitching or rolling of the powerplane assembly 33 does not induce motion of the cabin 31. Thus, a passenger in the cabin 31 experiences much less movement as compared to aircraft designs for which the powerplane 33 is indexed to the cabin about the pitch and roll axes. In addition, the passive pivoting of the powerplane assembly 33 relative to the cabin 31 acts as a filter to dampen out vibrations from the rotors 52 such that less vibration is felt in the cabin 31.

By decoupling movement of the powerplane assembly 33 and the fuselage 25 about the pitch axis and the roll axis as described above, the powerplane assembly 33 is able to respond to thrust changes more quickly since the weight of the fuselage 25 does not resist the powerplane assembly's changes about the pitch axis and the roll axis. This enhances maneuverability of the aircraft 20, which may be particularly important in urban areas where sudden or abrupt course changes might be needed or desired.

Figure 20:
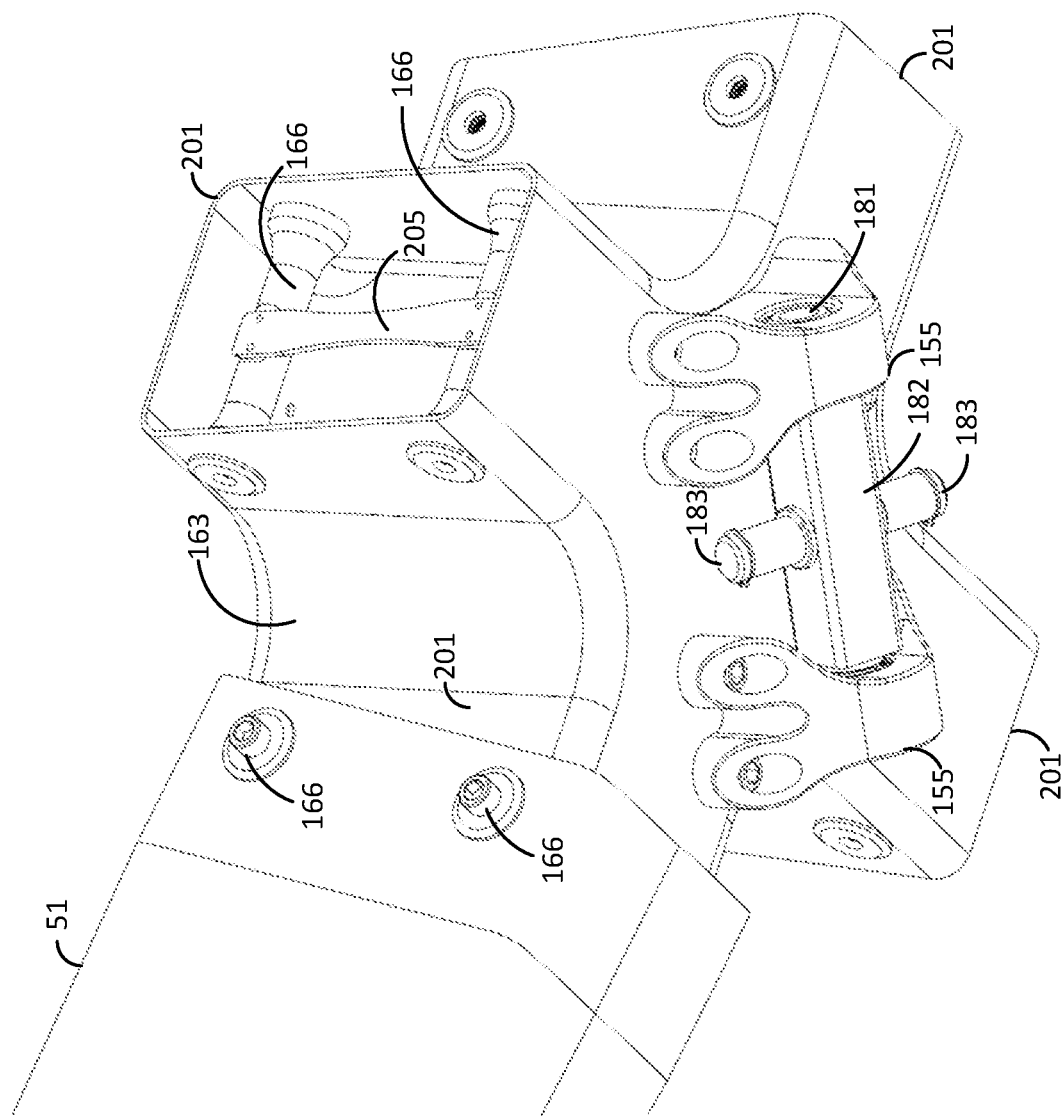
FIG. 20 depicts a perspective view of a support structure for connecting booms of a powerplane assembly to the pivotal coupling depicted by FIG. 16.

FIG. 20 depicts an embodiment of the boom mount 163 connected to one boom 51 and the pillow blocks 155 of the pivotal coupling 152 (FIG. 16). The boom mount 163 comprises a plurality of hollow brackets 201, each of which has a shape corresponding to that of the proximal end of a boom 51 to be secured to the bracket 201. In the embodiment depicted by FIG. 21, the proximal end of each boom 51 is hollow for receiving a bracket 201 and has a rectangular cross-section, and the bracket 201 has walls that form the same approximate cross-sectional shape as the proximal end of the boom 51. Thus, the proximal end of the boom 51 forms flat, faceted surfaces that are dimensioned to receive a respective bracket 201 of the boom mount 163. In some embodiments, the proximal end of a boom 51 and the bracket 201 to be mated with the boom 51 are dimensioned such that the bracket 201 snugly fits into the proximal end of the boom 51. Once the bracket 201 is inserted into the proximal end of the boom 51, one or more bolts 166 or other types of couplers are inserted through the walls of the boom 51 and the bracket 201 to secure the boom 51 to the bracket 201. As shown by FIG. 20, each bracket 201 has one or more horizontal spindles 205 that span the inner walls of the bracket 201 to help stabilize and prevent deformation of the bracket walls.

Figure 2:
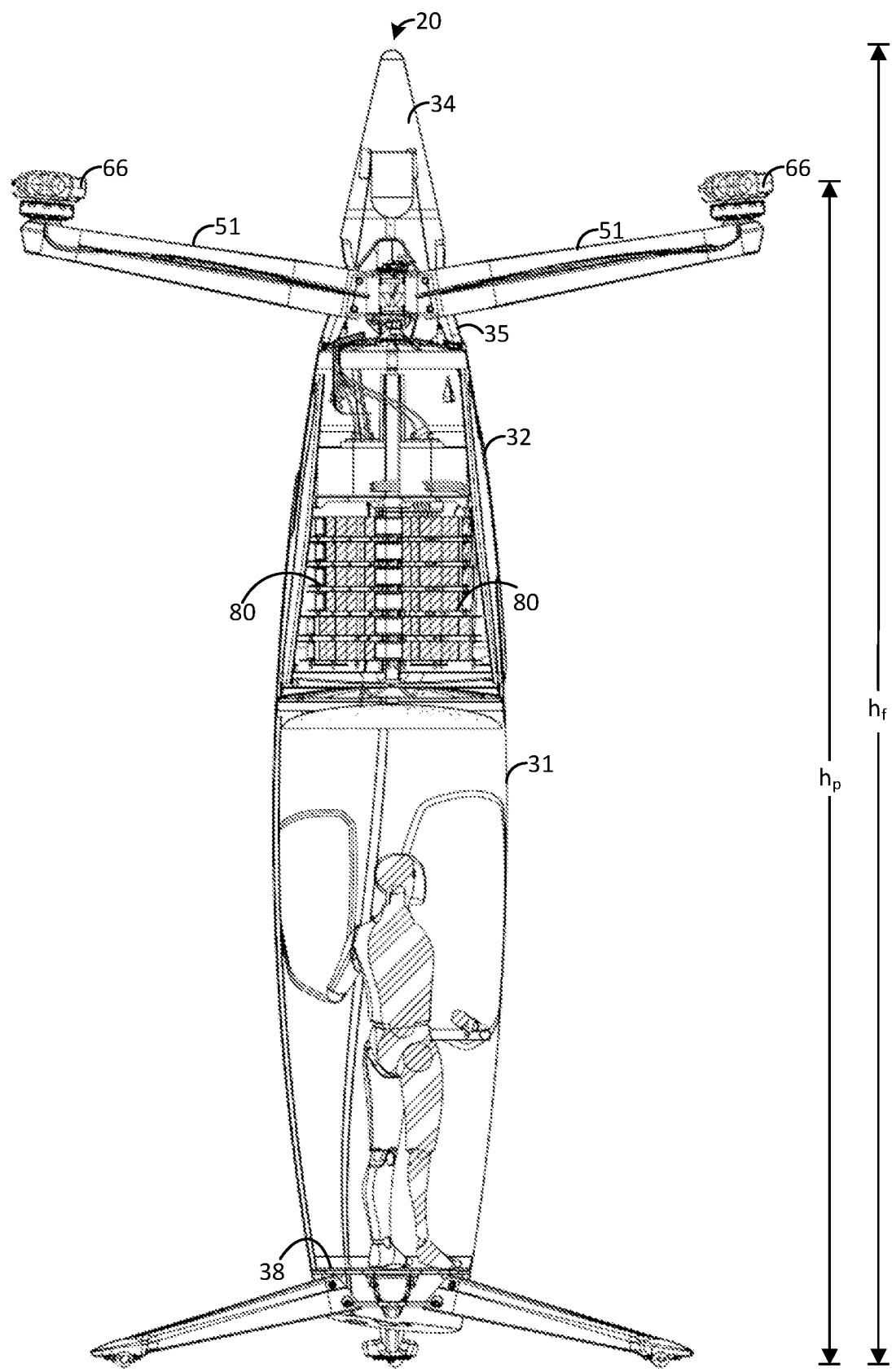
FIG. 2 depicts a side view of the VTOL aircraft of FIG. 1 with portions of the fuselage removed to expose components within the fuselage.
Figure 21:
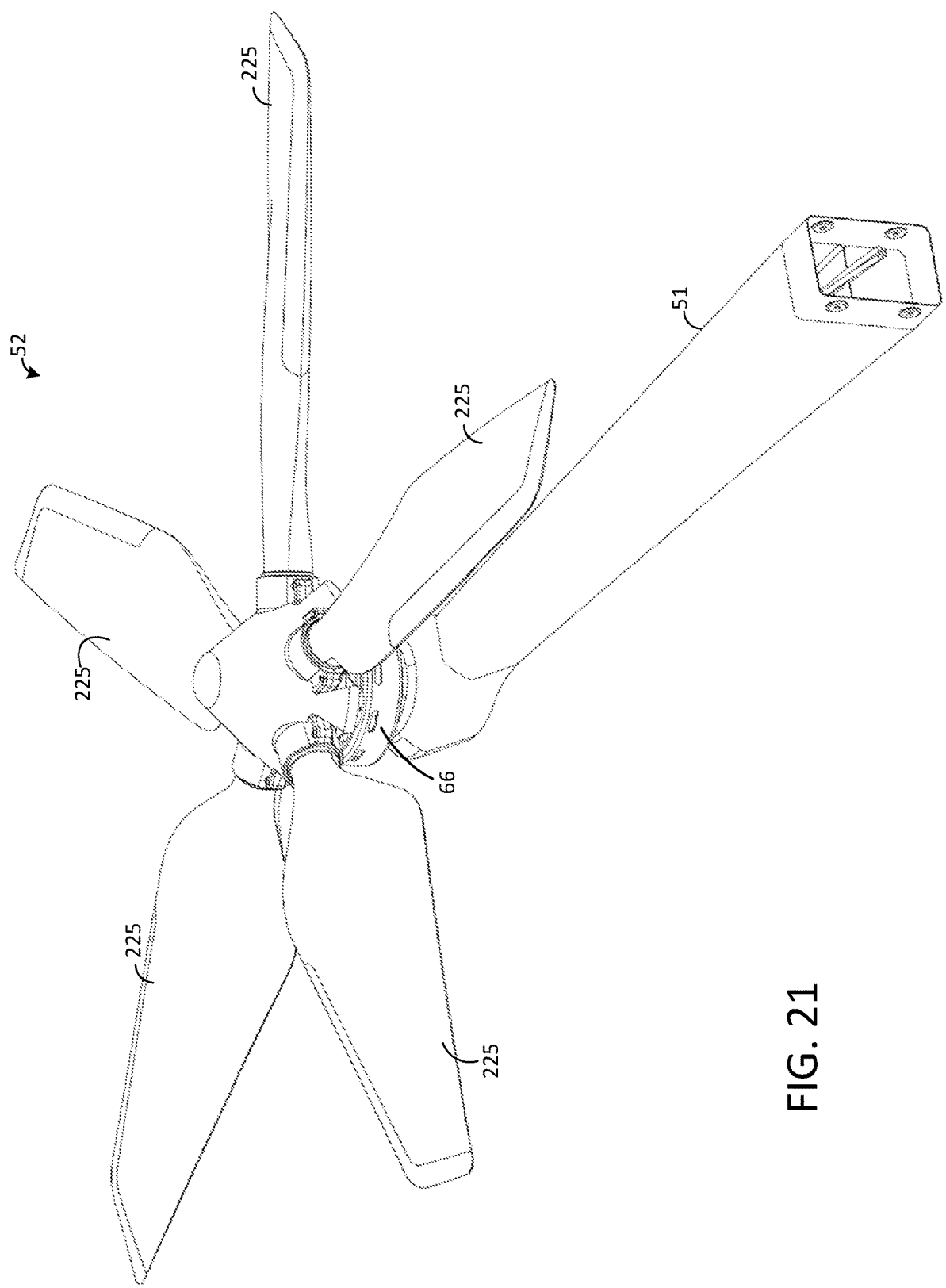
FIG. 21 depicts a perspective view of a boom connected to a motor and rotor assembly for VTOL aircraft, such as is depicted by FIG. 1A.

The distal end of each boom 51 is coupled to a respective rotor 52 and motor 66 (FIG. 2). As shown by FIG. 21, each rotor 52 has a plurality of rotor blades 225, and its motor 66 is configured to operate under the control of a corresponding motor controller 65 (FIG. 4) to rotate the blades 225 such that they interact with air to force air downward thereby providing a thrust in the opposite direction. As known in the art, the speed at which the blades 225 rotate or spin generally controls the amount of thrust provided by the rotor 52. In one embodiment, the diameter of each rotor 52 is about 76 inches. That is, the distance from the center of the rotor 52 to the tip of a given blade 225 is about 38 inches. Further, the booms 51 are dimensioned such that the overall width ($w_p$) of the rotors 52 of the powerplane assembly 33 is about 15.7 feet. That is, the maximum reach of the rotor blades 225 from the longitudinal axis of the fuselage 25 is about 7.85 feet. In other embodiments, other dimensions of the rotors 52 and booms 51 are possible.

In addition, as previously noted above, the vertical orientation of the fuselage 25 with the powerplane assembly 33 mounted above the fuselage 25 helps to raise the rotors 52 off of the ground for safety while utilizing a relatively small footprint and/or aircraft size. For example, in the embodiment described above for FIG. 1A, the rotors 52 may be located about 15.8 feet off of the ground, which is more than sufficient to ensure that they do not inadvertently contact a person walking fully erect beneath the rotors 52. In this regard, keeping the rotors 52 about 10 feet or more off of the ground should make the height of the rotors 52 greater than the height of even the tallest person likely to use the aircraft 10 while adding a suitable margin of error.

In addition, a greater height of the rotors 52 helps to reduce the effects of ground effect and potential for rotor wash recirculation interactions during takeoff and landing when the aircraft 20 is close to the ground. Indeed, such a height of the rotors 52 from the ground should position rotors 52 out of ground effect, thereby providing improved hover performance during landing and takeoff. Greater rotor height also reduces risk of injury to a passenger during an event that causes rotor or blade separation and also the risk of damage from foreign object debris (FOD) from objects on the ground that may be blown by the rotor wash. By creating a tall, narrow column of air, there should be reduced horizontal downwash velocity (increasing safety to passengers or other persons in the vicinity of the aircraft 20) and reduced risk of FOD recirculation as compared to aircraft designs with a shorter rotor height, such as at least some helicopters.

Figure 3:
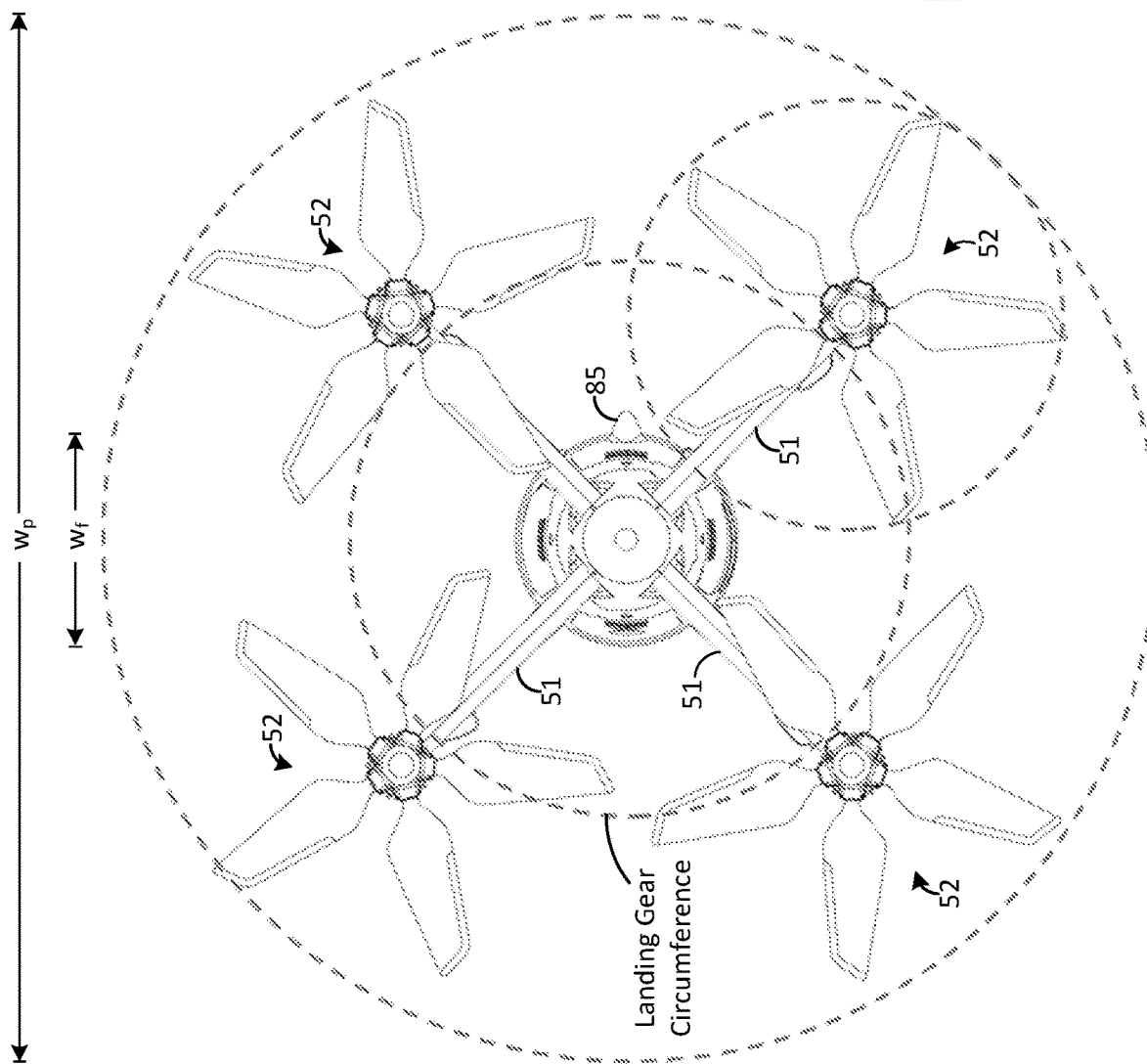
FIG. 3 depicts a top view of the VTOL aircraft depicted by FIG. 1A.

In some embodiments, the aircraft 20 has an aspect ratio ($h_p/w_p$), referred to hereafter as "powerplane aspect ratio," of about 1.0 or greater, where "$h_p$" is the maximum rotor height of the powerplane assembly 33 in the z-direction and "$w_p$" is the maximum rotor width (i.e., from blade tip-to-blade tip) of the entire powerplane assembly 33 in the x-direction, as shown by FIG. 3. As an example, in one embodiment described above, $h_p$ is about 15.8 feet and $w_p$ is about 15.7 feet. However, other dimensions and ratios are possible. Indeed, greater rotor heights may help to enhance at least some of the benefits described above, including reduced ground effect and potential for rotor wash recirculation interactions that can affect controllability of the aircraft 20 close to the ground, as well as enhancing safety and the passenger perception of safety. In fact, in some embodiments, it may be desirable for the powerplane aspect ratio to be at least 2.0 or even 3.0 or more.

Note that the design of the aircraft 20 with a high powerplane aspect ratio helps to de-couple the ground footprint from rotor size. Thus, rotor diameter can be increased as desired to increase lift, reduce noise, or provide other benefits, without increasing the aircraft's ground footprint. Also, such design along with a streamlined fuselage 25 provides reduced vehicle interaction with rotor downwash, thereby providing for steady, smooth takeoffs and landings, particularly in conjunction with light, responsive powerplane differential thrusting. Various other benefits of a relatively high powerplane aspect ratio are also possible.

Note that the use of electrical motors 66 in the configurations shown and/or described herein provide many advantages and benefits. In this regard, electrical motors 66 are clean and efficient helping to reduce pollution and waste. In addition, electrical motors 66 typically are much quieter than other types of motors, thereby enabling the aircraft 20 to access more locations in urban environments. Using multiple rotors 52 helps to reduce the required speed of the rotor blades of each respective rotor 52 in order for the powerplane assembly 33 to generate a desired amount of lift. In addition, using a vertically elongated fuselage 25 allows for a greater height of the powerplane assembly 33, thereby permitting larger rotor blades to be used without increasing the aircraft's ground footprint. Using larger, slower-rotating blades decreases the amount of noise generated by the rotors 52 and, thus, helps to make the aircraft more conducive to urban environments.

During operation, the flight controller 63 (FIG. 4) is configured to receive input from the sensors 69 and to control flight of the aircraft 20 based on the sensor inputs. As an example, the sensors 69 may indicate aircraft attitude and movement (e.g., airspeed), and the flight controller 63 may provide control signals to the motor controllers 65 for controlling the rotors 52 to generate the appropriate thrust for achieving a desired attitude of the powerplane assembly 33 and movement of the aircraft 20. At least some sensors 69 (e.g., a GPS sensor) may be used to sense the location of the aircraft 20, and the flight controller 63 may control movement of the aircraft 20 in order to navigate the aircraft 20 to a desired destination. At least some sensors 69, such as radar or LIDAR, may be used to sense objects external to the aircraft 20, and the flight controller 63 may use information from these types of sensors to sense and avoid collision threats.

Based on the input from the sensors 69, the thrusts generated by the rotors 52 are controlled to move the aircraft 20 as desired to a destination. As an example, thrust may be increased to lift the aircraft 20 off the ground. After taking off, differential thrusting may be used to control the direction of flight and attitude of the powerplane assembly 33. Thrusting may also be used to control the ascent and descent of the aircraft 20 as may be desired. As the attitude of the powerplane assembly 69 is changing about the pitch axis and roll axis, the fuselage 25 hangs from the pivotal coupling 152 and maintains a vertical orientation due to gravity independent of the movements of the powerplane assembly 33 and, thus, rotors 52 about the pitch axis and roll axis.

Once the aircraft 20 reaches its destination, the flight controller 63 controls the rotors 52 so that the aircraft 20 gently lands on the legs 36. If an emergency condition is detected during the flight, such as a detection of a fire or failure of a critical component (e.g., one or more rotors 52), the flight controller 63 may be configured actuate the BRS 100 in order to deploy a parachute that allows the aircraft 20 to slowly and safely return to the ground. In other embodiments, other techniques and/or recovery systems for handling an emergency condition are possible.

As previously noted above, the exemplary aircraft designs described herein have many advantages relative to conventional aircraft. As an example, the exemplary aircraft described herein have a relatively simple and efficient design helping to reduce manufacturing and operating costs, yet they have many safety features that prevent injury and allow reliable and effective recovery from various emergency events. Indeed, the aircraft are capable of withstanding various types of failures and protecting a passenger in the event of an electrical fire. In addition, the powerplane assembly 33 is located high off the ground such that inadvertent contact between the rotors 52 and people on the ground is prevented. The aircraft described herein can operate using clean energy with relatively low noise and provide VTOL capability thereby permitting use of the aircraft in urban areas where noise and access to suitable landing sites are concerns. Also, the aircraft has a relatively small horizontal footprint allowing it access to some locations, particularly in an urban environment, that may otherwise be difficult to reach. Various other benefits and advantages are described herein and also would be apparent to a person of ordinary skill upon reading this disclosure.

What is claimed:

1. A vertical takeoff and landing (VTOL) aircraft, comprising:
a pivotal coupling having a boom mount;
a fuselage comprising (i) a cabin coupled to the boom mount (ii) and a powerpack assembly, the powerpack assembly comprising an intake duct, an outlet duct, and at least one battery pack within the fuselage positioned above the cabin between the cabin and the pivotal coupling, wherein the intake duct is configured to receive cooling air generated by at least one of a plurality of rotors for cooling the powerpack assembly;
a powerplane assembly having the plurality of rotors and a plurality of booms directly coupled to the boom mount and coupling the plurality of rotors to the boom mount, each of the plurality of rotors comprising at least one rotor blade and an electrical motor for driving the at least one rotor blade, wherein the pivotal coupling permits the powerplane assembly to passively pivot relative to the cabin about a pitch axis and a roll axis, wherein the cabin is indexed to the powerplane assembly about a yaw axis, and wherein the yaw axis is perpendicular to the pitch axis and the roll axis, wherein the at least one battery pack is electrically coupled to the electrical motors of the plurality of rotors;
a plurality of motor controllers coupled to the electrical motors of the plurality of rotors; and
a flight controller configured to communicate with the plurality of motor controllers for controlling spinning speeds of the rotor blades of the plurality of rotors.

2. The VTOL aircraft of claim 1, wherein the fuselage is vertically elongated.

3. The VTOL aircraft of claim 2, wherein the fuselage has a height-to width-aspect ratio equal to or greater than 2.0.

4. The VTOL aircraft of claim 3, wherein the powerplane assembly has a height-to-width aspect ratio equal to or greater than 1.0.

5. The VTOL aircraft of claim 3, wherein the powerplane assembly has a height-to-width aspect ratio equal to or greater than 2.0.

6. The VTOL aircraft of claim 2, wherein the fuselage has a height-to width-aspect ratio equal to or greater than 3.0.

7. The VTOL aircraft of claim 1, further comprising a ballistic recovery system for deploying at least one parachute, wherein the at least one parachute is coupled to the cabin.

8. The VTOL aircraft of claim 1, wherein the fuselage has a base coupled to landing gear, and wherein the cabin is between the base and the at least one battery pack.

9. The VTOL aircraft of claim 8, wherein the landing gear comprises a plurality of legs extending from the base.

10. The VTOL aircraft of claim 1, wherein the pivotal coupling comprises a first pin, and wherein the powerplane assembly is rotatable about the first pin for rotating about the pitch axis.

11. The VTOL aircraft of claim 10, wherein the pivotal coupling comprises a second pin, and wherein the powerplane assembly is rotatable about the second pin for rotating about the roll axis.

12. The VTOL aircraft of claim 1, wherein the flight controller is further configured to cause the plurality of motor controllers to control the plurality of electrical motors thereby causing the plurality of rotors to generate differential thrust such that the powerplane assembly (1) simultaneously and passively pivots via the pivotal coupling about the pitch axis and the roll axis relative to the fuselage and (2) is indexed to the cabin about the yaw axis.

13. The VTOL aircraft of claim 1, wherein the at least one battery pack comprises a plurality of battery packs, wherein each battery pack of the plurality of battery packs is individually capable of powering each of the electrical motors.

14. The VTOL aircraft of claim 1, wherein the outlet duct is coupled to a cooling fan that is configured to create negative air pressure within the powerpack assembly.

15. The VTOL aircraft of claim 1, further comprising a fire-resistant bulkhead between the at least one battery pack and the cabin and configured to separate the at least one battery pack from the cabin.

16. The VTOL aircraft of claim 15, wherein the fire-resistant bulkhead is configured to prevent smoke or fire from entering the cabin for a time corresponding to a descent time of the VTOL aircraft from an operational altitude of the VTOL aircraft.

17. A method, comprising:
generating thrusts with a plurality of rotors mounted on a vertical takeoff and landing (VTOL) aircraft, each of the plurality of rotors comprising at least one rotor blade and an electrical motor of a plurality of electrical motors for driving the at least one rotor blade, wherein each of the plurality of rotors is coupled to a boom mount of a pivotal coupling via a boom extending from the boom mount, wherein each boom is directly coupled to the boom mount; and
controlling the plurality of electrical motors such that the thrusts generated by a plurality of rotors enable the powerplane assembly to tilt in two dimensions such that the powerplane assembly (1) passively pivots via the pivotal coupling about a pitch axis and a roll axis relative to a fuselage of the VTOL aircraft having a cabin and (2) is indexed to the cabin about a yaw axis, wherein the yaw axis is perpendicular to the pitch axis and the roll axis, wherein the fuselage comprises a powerpack assembly comprising an intake duct an outlet duct, and at least one battery pack, the at least one battery pack electrically coupled to the electrical motors of the plurality of rotors and positioned above the cabin between the cabin and the pivotal coupling, wherein the intake duct is configured to receive cooling air generated by at least one of the plurality of rotors for cooling the powerpack assembly.

18. The method of claim 17, wherein the fuselage is vertically elongated.

19. The method of claim 17, wherein the fuselage has a height-to width-aspect ratio equal to or greater than 2.0.

20. The method of claim 19, wherein the powerplane assembly has a height-to-width aspect ratio equal to or greater than 1.0.

21. The method of claim 19, wherein the powerplane assembly has a height-to-width aspect ratio equal to or greater than 2.0.

22. The method of claim 17, wherein the fuselage has a height-to width-aspect ratio equal to or greater than 3.0.

23. The method of claim 17, further comprising deploying at least one parachute from a ballistic recovery system of the aircraft, wherein the at least one parachute is coupled to the cabin.

24. The method of claim 17, wherein the fuselage has a base coupled to landing gear, and wherein the cabin is between the base and the at least one battery.

25. The method of claim 24, wherein the landing gear comprises a plurality of legs extending from the base.

26. The method of claim 17, wherein the pivotal coupling comprises a first pin, and wherein the powerplane assembly is rotatable about the first pin for rotating about the pitch axis.

27. The method of claim 26, wherein the pivotal coupling comprises a second pin, and wherein the powerplane assembly is rotatable about the second pin for rotating about the roll axis.

28. The method of claim 17, wherein the outlet duct is coupled to a cooling fan that is configured to create negative air pressure within the powerpack assembly.

29. The method of claim 17, wherein the at least one battery pack and the cabin are separated by a fire-resistant bulkhead between the at least one battery pack and the cabin.

30. The method of claim 29, wherein the fire-resistant bulkhead is configured to prevent smoke or fire from entering the cabin for a time corresponding to a descent time of the VTOL aircraft from an operational altitude of the VTOL aircraft.

\* \* \* \* \*